United States Patent [19]

Van Dijk

[11] Patent Number: 4,847,854
[45] Date of Patent: Jul. 11, 1989

[54] LASERS

[76] Inventor: Johannes W. Van Dijk, 36 River View Avenue, North Ferriby, North Humberside, Hull, Great Britain, HU14 3DT

[21] Appl. No.: 120,537

[22] Filed: Nov. 13, 1987

[51] Int. Cl.$^4$ ................................................ H01S 3/08
[52] U.S. Cl. ........................................ 372/92; 372/19; 372/20; 372/29; 372/61; 372/87; 372/98; 372/99; 372/107
[58] Field of Search ........................ 372/20, 19, 29, 32, 372/92, 98, 99, 107, 87, 61

[56] References Cited

FOREIGN PATENT DOCUMENTS 8604746  8/1986  Australia ................................ 372/20

OTHER PUBLICATIONS

Daneshver-Hosseini et al., "A Microprocessor-Controlled Laser Grating System for Laser Tuning", Optics and Laser Technology, Jun. 1982, pp. 137–142.

Primary Examiner—William L. Sikes
Assistant Examiner—Georgia Y. Epps
Attorney, Agent, or Firm—Bacon & Thomas

[57] ABSTRACT

An optical resonator for a laser includes an optical element mounted for rotation about two mutually transverse axes and controllable by a computer for automatically adjusting the orientation of the optical element.

9 Claims, 36 Drawing Sheets

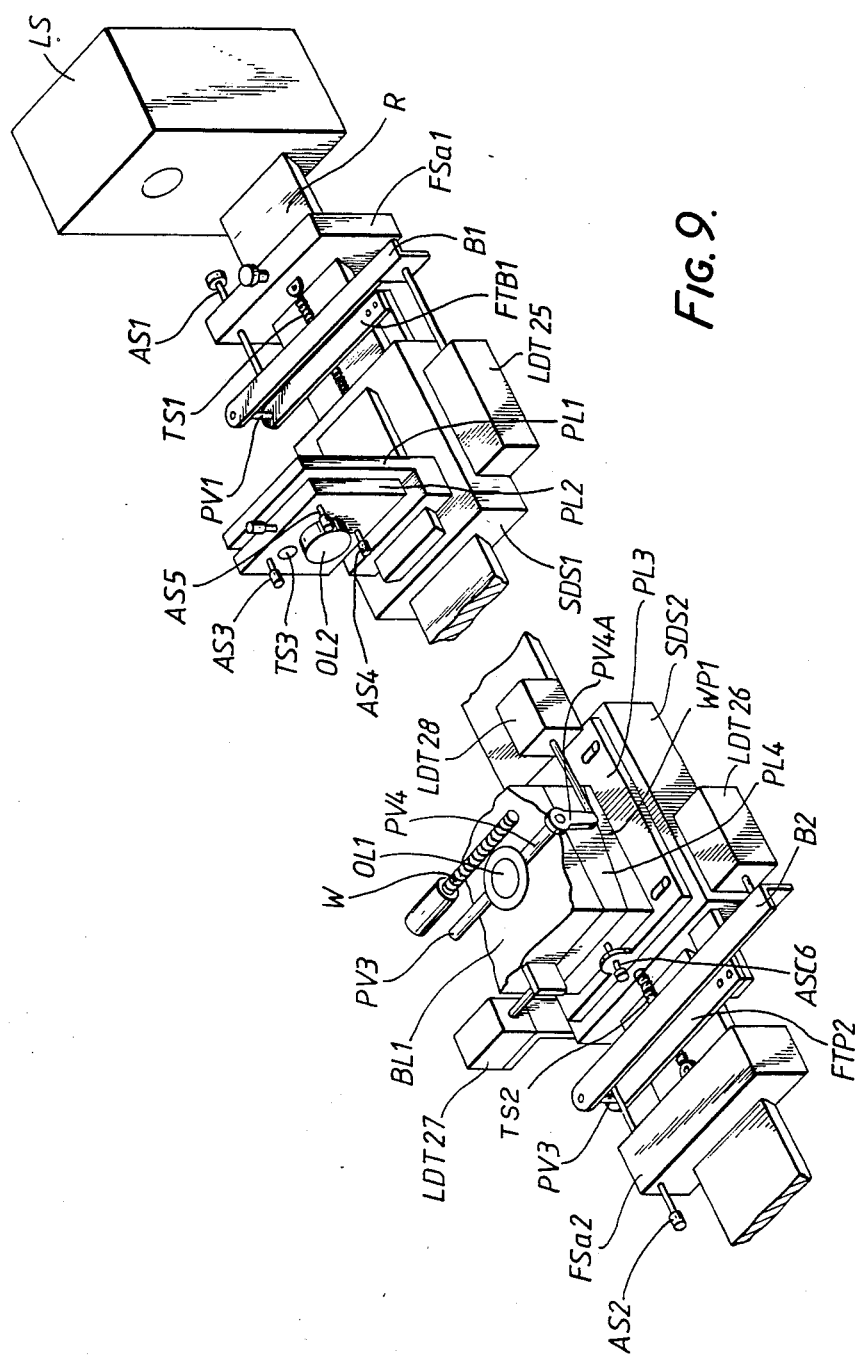

LASERS

FIELD OF THE INVENTION

The present invention relates to a laser controllable by a computer for use in industrial applications.

BACKGROUND OF THE INVENTION

It is known to use optical systems with a laser to achieve a desired operational mode thereof, but the known arrangements have been of a limited applicability or useful only for academic purposes.

SUMMARY OF THE INVENTION

It is an object of the present invention to provide in a laser set-up a practicable optical system for permitting, within the capabilities of the laser itself, a greater selectivity of the operational mode.

There is provided by the present invention a laser, comprising an optical resonator, characterised in that resonator elements are controlled by a computer ($C_pU$) to facilitate extraction of energy substantially concentrated in a single transverse mode. Preferably, the resonator elements are orientated to provide maximum feedback to the computer from the output of the laser to extract the energy from the laser along a single optical axis thereof; the feedback signal from the laser being that whose spatially distributed energy is of a single gaussian form. Preferably, the resonator elements are adjustable in such manner that the resonator can be substantially tuned over the emission bandwidth. The resonator may comprise two, three or four optical elements. In the case in which the resonator comprises more than two elements, preferably, the reflectivity of the resonator is optimised to assist frequency narrowing or selectivity imposed on the emission bandwidth of the laser medium.

It is also preferred that the said optical elements be mounted independently of the discharge chamber of the laser. The optical elements may be supported on a rail-mounted carriage, the carriage being slidable along the rail. The carriage and the rail may comprise a complementary dove-tail formation to prevent movement of the carriage other than said sliding movement.

The means for effecting adjustment of the optical elements may comprise stepping motors, and the stepping motors may be supported on the carriage.

The present invention is considered to be especially useful with a high-pressure gas laser. In this context, high pressure is intended to mean at least 5 atmospheres, more preferably at least 8 atmospheres, and still more preferably approximately 10 atmospheres. The gas employed will usually be a multi-atmosphere gas, e.g., a mixture of $CO_2$, $N_2$ and He. Preferably, the laser is continuously tunable.

With such a high-pressure laser, it is desirable to take precautions against electromagnetic radiation emitted by the discharges of the laser and accordingly, the laser of the present invention may comprise a discharge chamber constituted as a multiple electromagnetic screen in the form of a plurality of vessels located one within the other. They may be arranged coaxially, and it is presently preferred to employ two vessels sealed together at their axial ends and clamped thereat between end flanges held against the axial ends by tie rods passing between the two end flanges. The outermost vessel is directed grounded.

The vessels may have axially and radially aligned access slots in which respective ports can be constructed to provide for circulation and cooling of laser gas and for admission of high-tension leads, or alternatively, to serve as inspection or diagnostic ports.

The high-pressure laser preferably employs pre-ionising electrode arrays, and, in one embodiment, four sliding spark arrays are employed one on each side of each main electrode.

The main electrodes and the pre-ionising electrode arrays may employ a discharge circuit operating to release stored electrical energy on activation of a circuit make/break device inductively controlled by a trigger circuit providing the ground return for the discharge circuit. To prevent, on discharge of the stored electrical energy, a current being reflected into the trigger circuit sufficient to cause an undue voltage to be imposed on the circuit ground return, the trigger or discharge circuit may comprise a current limiting resistor so that the circuit is effectively floating during discharge, or a switch to isolate the circuit from supply during discharge.

BRIEF DESCRIPTION OF THE DRAWINGS

FIG. 9 is a diagrammatic perspective view of part of the optical system of the embodiment;

DESCRIPTION OF THE PREFERRED EMBODIMENT

Figure 1:
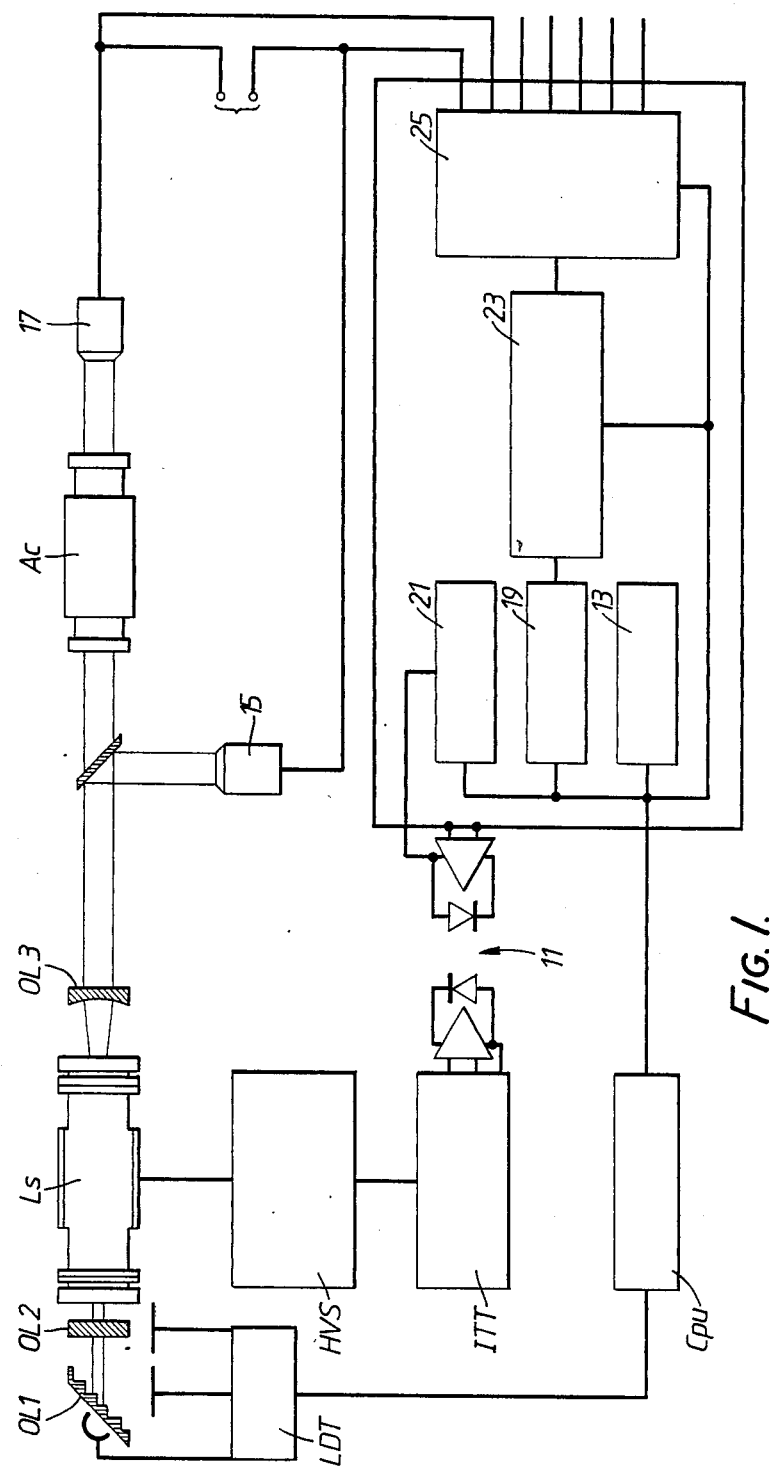
FIG. 1 is a block diagram of a high-pressure, multi-atmosphere laser (MAL) of the preferred embodiment with computer controlled high-voltage equipment, diagnostics and motor positioners.

Referring to FIG. 1, the laser Ls, in this instance a high-pressure, multi-atmosphere laser, with its optical cavity or resonator consisting of three elements OL1, OL2 and OL3, is diagrammatically illustrated. The three elements make up a "third-mirror" cavity and consist of a grating (OL1), a suppressor mirror (OL2), and an output coupler (OL3). As will be explained in more detail below, the grating is mounted to be rotatable about three mutually perpendicular axes, and the suppressor mirror is mounted to be translatable towards and away from the grating, by respective stepping motors under the control of a computer (Cpu). The computer also controls and monitors operation of the laser.

In this instance, the computer was an APPLE II PLUS personal computer.

Figure 2:
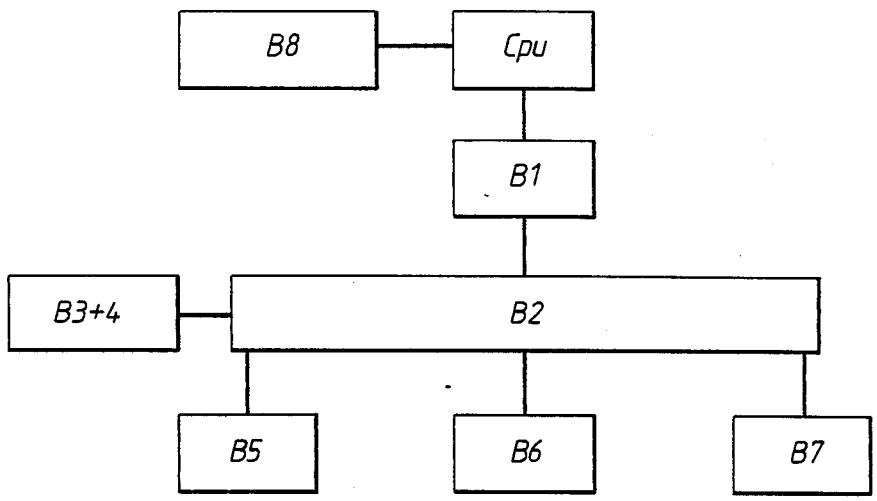
FIG. 2 is a flow chart of an electronic control system of the preferred embodiment.

A multiplexed I/O MPE extension 25 of the APPLE bus permits extra address lines for the control instructions. Circuitry mounted on individual "Eurocards" controls the trigger of the laser and measures the laser energies before and after the absorption cell. A diagram of this control system is shown in FIG. 2. The same computer is used through a separate interface to control the laser frequency and mode structure. The three main sections are discussed below.

TABLE I

| No. | Name of Board | Function |
|---|---|---|
| B1. | APPLE interface board | Interfacing the APPLE II with the EURORACK system. |
| B2. | EURORACK backplane board | Distributing the signals of the EURORACK card subrack system bus to all boards. |
| B3. | V8−, V18+, and V18− power supplies | |
| B4. | V8+ power supply. | |
| B5. | A/D conversion board. | A/D conversion programmable gain and multiplexing. |
| B6. | pyro adapter board. | +9 V and −9 V power supplies for the pyro detectors. |
| B7. | Trigger/timer board. | Programmable timer and generating the optical trigger pulse. |
| B8. | Motor controller. (not Eurocard) | Programmable step increment (1 m) and direct control. |

The high voltage trigger of the laser is activated with an optic unit, generally indicated at 11 and comprising a "Radio Spares" opto-trans/receiver package and fibre cable. The computer (Cpu) initializes a programmable timer 13 which controls the timing of the pulse generator of the optic unit. The software controlled timer allows arc-free operation between 0.1 and 10 Hz. The current software provides repetition frequencies up to 100 Hz. The optic unit fires the laser via a Hartley trigger HTT and the high-voltage supplies HVS.

The output of the laser was measured with thermal detectors 15,17 (piezo-electric crystals with pyro-electric properties) having a rise time of 2 msec. and giving a maximum output voltage of 12.3 V/Joule linear with the incident photon flux. The beam passes through an absorption cell Ac before passing to detector 17. The linearity of the detectors was within 2% and was checked with a calibrated Gentec pyro-electric calorimeter which had a 1% linearity. The trigger signal from a trigger unit 21 used to initialize the opto-isolated laser fire control simultaneously activates the pre-trigger of the 10-bit A/D converter 19 to sample the delayed maximum output voltage of the detectors. The time delay between laser fire and first A/D conversation channel is also under software control and may be varied between 0.1 to 10 msec.

Figure 3:
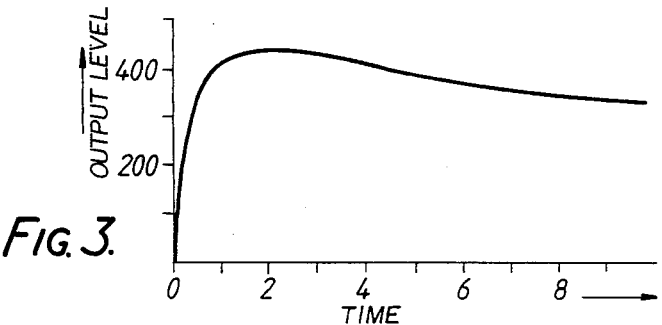
FIG. 3 is a graph of the output with time (plotted horizontally) of a component of the control system as determined by analog to digital sampling.

The gain of the amplifier 23 following the A/D conversion is software selected. Four such A/D conversion channels were provided, sampling being sequential over a period of 100 microsec. Considering the slow voltage variation at peak detector output level (see FIG. 3), neither the 2% voltage variation over the sample period nor the 100 nsec. Jitter between the P.I. trigger and the laser output is significant.

The accuracy of an energy measurement is determined by the accuracy of the pre-amplifier gain, which was calibrated with a reference voltage; an accuracy of 2% at all gain settings (0–42 dB) could be obtained.

Figure 4:
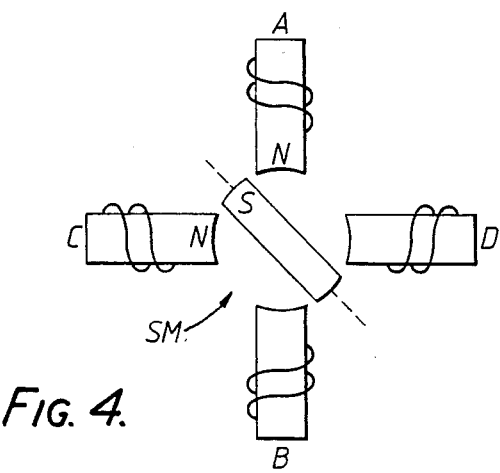
FIG. 4 is a diagram of the stator and rotor orientation of a stepping motor employed in the preferred embodiment.

Identical translational stepper motors (see FIG. 9 especially) control the positions of the elements in the linear three mirror cavity. A stepper motor SM is exemplified in FIG. 4. A pair of energized stator windings are represented by the magnetic poles A-D with polarities as shown. By switching the polarities of the stators it is possible to place the rotor either directly opposite or between pairs of the stator poles, the so called half or full step mode. Table 2 shows a series of stator polarities that would make the rotor rotate with half step increments ("ON" would indicate polarity on "N", while "OFF" indicates that the polarity is removed). Such a sequence would be put out by the logic interface board controlling a stepper micrometer.

TABLE II

| Step | Stator coil | | | |
|---|---|---|---|---|
| | A | B | C | D |
| 1 | ON | OFF | ON | OFF |
| 2 | ON | OFF | OFF | OFF |
| 3 | ON | OFF | OFF | ON |
| 4 | OFF | OFF | OFF | ON |
| 5 | OFF | ON | OFF | ON |
| 6 | OFF | ON | OFF | OFF |
| 7 | OFF | ON | ON | OFF |
| 8 | OFF | OFF | ON | OFF |
| 1 | ON | OFF | ON | OFF |

A linear digital transducter (LCT) which consists of a fine pitch precision worm gear activated by a four phase variable reluctance stepper motor is offered by Oriel.

The half step mode will produce a 1 micron positional increment of the output spindle for each half step of the stepper motor. In this mode, the stepper motor uses currents of 0.5A or 1A (depending on whether one or both stators are energized). The step rate can be varied under computer control between 20 and 1000 half steps per second without ramping. Two limit switches (not shown) are activated in order to shut the motor down before it runs into its end of travel stops. A knob at the rear of the steppermike can be used to make manual adjustments when the motor micrometer is not energized.

The specifications of the LDT are listed in Table 3.

TABLE 3

| Motor micrometer specifications | |
|---|---|
| Travel range, millimeters, mm | 12.7 |
| Step size, half step mode mm | 1.00 |
| Step size, full step mode, M | 2.00 |
| Max. step rate, half step mode steps/sec. | 1000 |
| Max. step rate, full step mode steps/sec. | 500 |
| Max. spindlespeed, mm/sec | 1.0 |
| Max. spindle force, kg. | 7 |

Backlash introduces an additional displacement of approximately 0.5 micrometer after each full or half step sequence. The reproducibility for a 200 step uni- and bi-directional movement is less than 2 micrometers.

Another advantage of these motors is that the travel range can cope with the grating movement which has to rotate between 43 degrees and 55 degrees with respect to its optical axis to select a single transition line from the emitted spectrum. A DIGIPLAN LD2 stepper motor driver (not shown) controls the LDT's. The input ports of the DIGIPLAN circuit board are originally activated through an open collector NPN transistor by the "annunciator" outputs (an IEEE socket) of an APPLE II PLUS computer. The four outputs used look after both direction and clock pulses for two LDT's. At each end of the micrometer travel the clock pulses are automatically inhibited by micro switches until the direction is reversed. There is no absolute position or direction indication on the LDT's available as a signal output to the computer, so that a relative position and direction control are used.

CO2 laser action is based on energy transfer between vibration/rotational CO2 levels of the excited molecules. These bands produce radiation on four emission regions in the 9 m and 10 m regions and are usually referred to as the 9p, 9R, and 10R branches. The individual laser transitions are specified by an index J.

For a low pressure CO2 laser (10 torr) Doppler broadening will dominate. At a high pressure (140 torr) this will be reversed. Collision will cause a phase change of the emitted wavetrain which is therefore discontinuous with each collision. These random changes in phase serve to broaden the emitted wavetrain.

Figure 5:
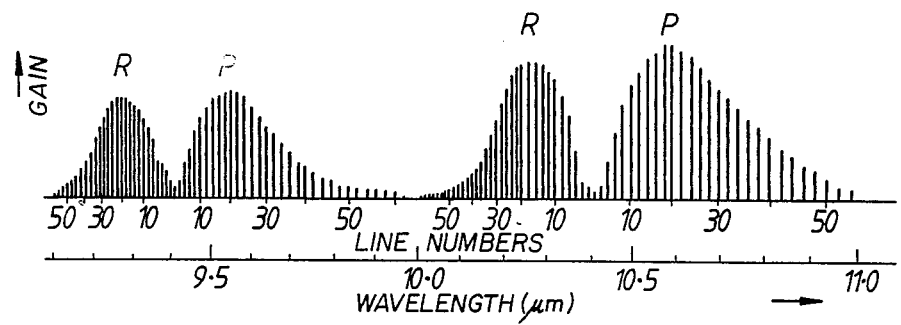
FIG. 5 is a graph of transmission lines of a low-pressure $CO_2$ laser (gain plotted vertically with line numbers plotted on the upper horizontal and wave length, on the lower horizontal)
Figure 6:
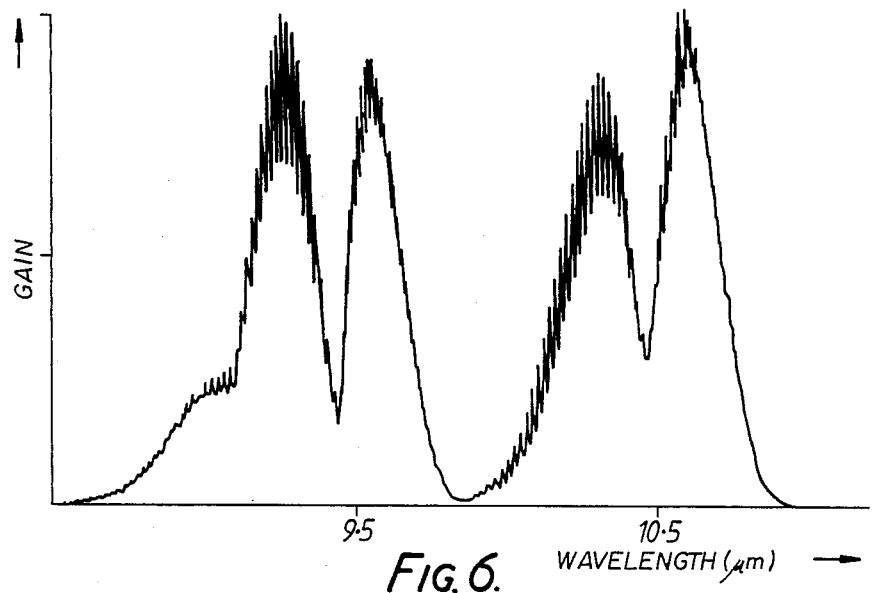
FIG. 6 is a graph showing the gain spectrum of a 10 atmosphere $CO_2$ MAL of the preferred embodiment (gain plotted vertically against wavelength $\mu m$)

At sufficiently high pressures (at approximately 8 atm.) the separate CO2 transition lines start to overlap and amalgamate into a continuous tuneable spectrum. This is illustrated in the FIGS. 5 and 6.

For a standard laser gas mixture containing CO2, N2 and He, the gain broadening bandwidth has been shown to be $$\Delta \nu_{res} = 5.79 * P_{CO2} + 3.72 * P_{He} + 4.23 * P_{N2} \qquad [6.1]$$

P represents the partial pressure of each corresponding constituent in atmosphere and $\Delta \nu_{res}$ is obtained in GHz.

In addition the collision broadening coefficient is also temperature dependent.

$$\Delta v_{res} \alpha \frac{P}{P_0} \sqrt{\frac{T_o}{T}} \qquad [6.2]$$

For a 10% N2, 80% He gas mixture with $P_0$ as the standard pressure of 1 atm. and a temperature $T_0$ of 293K, where P is the total pressure, T is the gas temperature in Kelvin. For completeness the accompanying pressure shift which is of relevance to tropospheric absorption spectroscopy is discussed. Figures which have been reported for pure CO2 are −19.7 Hz/Torr. More recently reported values are considerably less −5.6 Hz/Torr; these values implying that the pressure shift becomes larger and non-linear at high pressures. The tuning ranges of the low pressure CO2 lasers used are very limiting and are not representative of shifts at multi-atmospheric pressures. A pressure shift of −5 MHz/atm. has been reported with a CW and TEA laser set-up. Pressure shifts of this magnitude are not especially significant for absorption measurements, at least in the atmosphere. At an operational pressure of 10 atm., transitions will give an induced gain which will exceed the resonator losses for all frequencies intermediate between adjacent line centres and each of the four branches. The frequency spacing of these lines varies between 55 GHz in the P branch to 40 GHz in the R branch. Continuously tunable operation was obtained in the following wavelength regions as shown in Table III.

TABLE III

Tuning ranges and Pulse energy.

| Spectral region | Pulse energy | Tunable bandwidth |
| --- | --- | --- |
| 9 μm R branch | >50 mJ | R(28)-R(12) 10.9 cm-1 |
| 9 μm P branch | >50 mJ | P(12)-P(24) 10.7 cm-1 |
| 10 μm R branch | >50 mJ | R(32)-R(8) 15.6 cm-1 |
| 10 μm P branch | >50 mJ | P(8)-P(32) 21.6 cm-1 |

In other words a lasing range of 44 discrete emission lines is possible under computer control. These tunable I.R. spectra were taken with the following laser-discharge parameters:
 main discharge voltage: Δ 70-86 KV
 repetition rate: 10
 pps-pressure: 8-10 atm.

Figure 8:
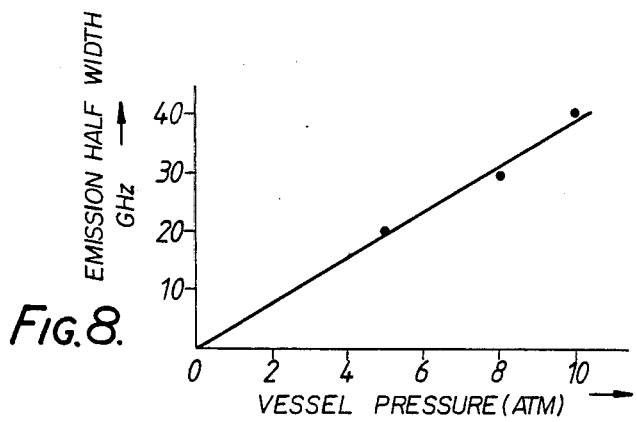
FIG. 8 is a graph of a FWHM emission of a collision broadened $CO_2$ MAL (emission half-width [GHz] plotted vertically against vessel pressure [atm])
Figure 7A:
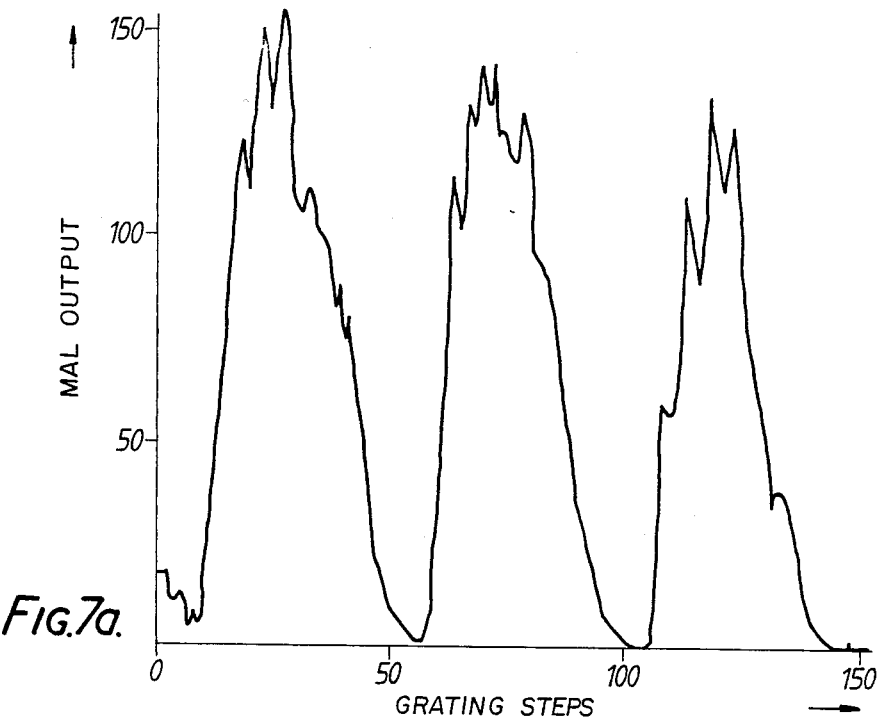
FIGS. 7 (a) to (c) are MAL output scans on the 10 R 12, 10 R 14 and 10 R 16 $CO_2$ lines at pressures respectively of 5, 8, and 10 atmospheres (MAL output plotted vertically against grating steps)
Figure 7B:
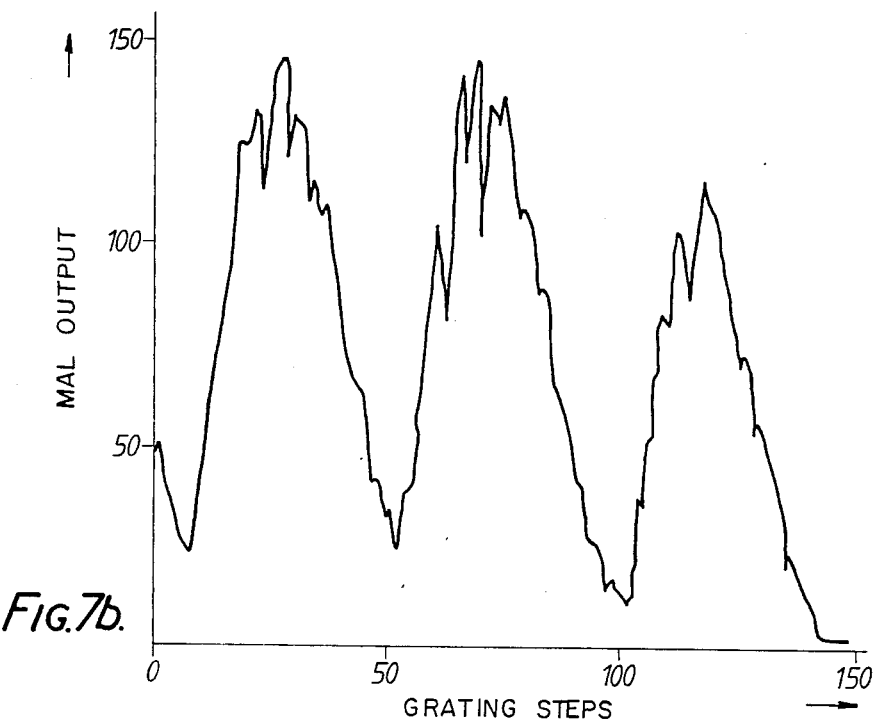
Figure 7C:
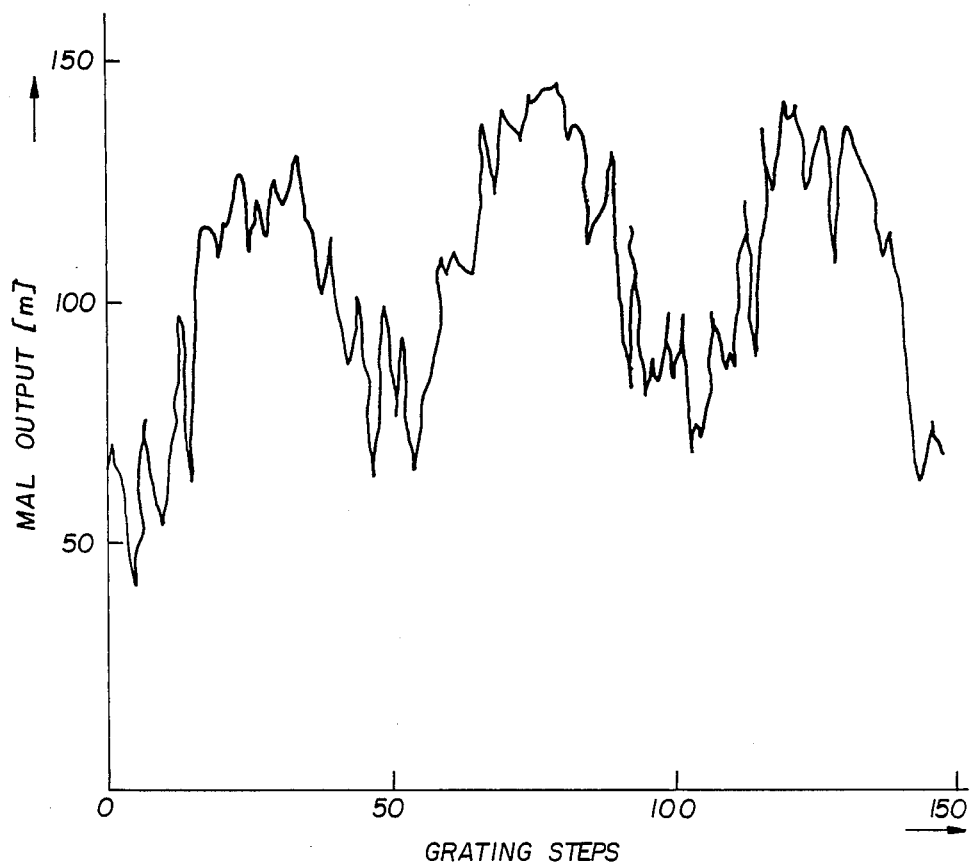

The output energy of the laser varied between 50-180 mJ depending on the emission line and main discharge voltage. The maximum output was limited to 180 mJ which was the damage threshold of the grating reflector. A reliable output near band centres was obtainable for all branches but operation in the 9R and 9P branches demanded maximum output voltage. This is undesirable as maximum output voltage shortens the lifetime of the peaking capacitor of the discharge circuit which has to cope with the maximum voltage variation. Despite the gain broadening due to the high pressures and the merging of the individual transition lines, there still exists a strong modulated output with maxima at line center and minima roughly halfway between the two transitions. Pressure enhancement will minimize this output modulation. This is illustrated in the results shown in FIGS. 7(a), (b), and (c) at pressures of 5, 8 and 10 atm with a scanning resolution of 0.85 GHz. FIG. 8 illustrates the empirical emission line width versus the gas pressure.

It is usually not preferable to build a complicated resonator within the pressure vessel itself. Thus, the cavity of the MAL (multi-atmosphere laser) consists of the inversion medium and the free propagation distances between the brewster windows and the resonator mirrors. The main factors which determine the frequency stabilization of the laser are the cavity components (reflectivity) and the mechanical support structure (reflector position). The cavity components were mounted on a rigid rail.

In the past, INVAR alloy ($\alpha$ $1*10^{-6}K^{-1}$) or low-expansion ceramic ($\alpha \simeq 1 \times 10^{-8}K^{-1}$) based cavity support structures were used to minimize the change in cavity length in a passive way, and frequency drift coefficients below 11 MHz/K were possible in CW-CO2 lasers. In the present case, this would have led to an impractical resonator structure, considering the dimensions of the MAL.

The hollow aluminum bar-shaped Oriel rail (27) was used to mount, inter alia, elements OL1 and OL2. The bar is rigid but has a high thermal expansion coefficient.

$$\alpha \simeq 24*10^{-6}K^{-1} \qquad [6.3]$$

The slow temperature drift can be compensated for with commercial PLZT based transducers, but this requires a mode hop function at the end of the travel range. This would complicate the locking of the multi-mirror cavity, because ultimately the third mirror and gating have to move in step with one another for SLM operation.

In FIG. 9, a dovetail guide rail R supports a laser Ls, two fixed saddles FSa1 and FSa2, and two slidably displaceable saddles SDS1 and SDS2.

The displaceable saddle SDS1 supports a rigid transverse bar FTB1 which presents a pivot pin PV1 upon which a bar B1 is pivotally supported adjacent one end. The actuating member of a stepping motor LDT 25 engages the free end of bar B1, an adjusting screw AS1 supported by fixed saddle FSa1 engages the bar B1 between the pivoted end and the free end thereof, closer to the pivoted end, and a tension spring TS1 extending between the fixed saddle FSa1 and the displaceable saddle SDS1 maintain the bar B1 in pressure engagement with the adjusting screw AS1.

Thus, as the actuating member of the motor LDT25 extends or contracts relative to its casing, the bar B1 is caused to displace angularly about the contact with adjusting screw AS1 displacing the displaceable saddle SDS1 in one direction or the other along the guiderail R.

In identical manner the displaceable saddle SDS2 supports a rigid transverse bar FTP2 which presents a pivot pin P3 upon which one end of a bar B2 is pivotably supported. The actuating lever of a second stepping motor LDT26 engages the free end of bar B2 and an adjusting screw AS2 supported by the fixed saddle FSa2 engages the bar B2 between its pivoted end and its free end, closer to its pivoted end. A tension spring TS2 between the fixed saddle FSa2 and the displaceable saddle SDS2 maintains the bar B2 in contact with the adjusting screw AS2. Thus, as the actuating member of the motor LDT26 extends or contracts relative to its casing, the bar B2 is caused to displace angularly about the contact with adjusting screw AS2, displacing the displaceable saddle SDS2 in one direction or the other along the guiderail R.

The adjusting screw AS1 engages the bar B1 at such position along its length as to afford a reduction ratio of 1:22.7 for the displacement of the movable slider SDS1 to the displacement of the actuating member of motor LDT25 and the reduction ratio is substantially identical for the bar B2 transmission to the saddle SDS2.

A plate PL1 with an aperture therethrough (not shown) is rigidly supported on a dovetailed guide presented by displaceable saddle SDS1 and supports a plate PL2 by way of a tension spring TS3 connecting the two plates. Three adjusting screws AS3, AS4, and AS5, in the plate PL2 contact the plate PL1 and the axis of the spring TS3 lies within the triangle connecting the axes of screws AS3, AS4, and AS5, whereupon the plane of plate PL2 can be adjusted relative to the plane of plate PL1 about vertical and horizontal axes.

The plate PL2 is apertured to receive a suppressor mirror OL2, which is rotatable relative to plate PL2.

The displaceable saddle SDS2 supports a base plate PL3 connected to saddle SDS2 by bolts in transverse slots in plate PL3 so that plate PL3 is transversely adjustable on the saddle SDS2.

A wedge plate WP1, slidable on the base plate PL3 and adjustable relative to the base plate PL3 between adjuster screws (only one adjuster screw AS6 is shown in FIG. 9) and a complementary shaped wedge on the lower surface of a plate PL4 resting on wedge plate WP1 is restrained against displacement in the direction of the guiderail R relative to the saddle SDS2. Thus, by adjustment of the wedge plate WP1 the height of the plate PL4 can be adjusted relative to saddle SDS2.

A block BL1 is supported on plate PL4 and pivotable about a vertical pivotal axis (not shown) under the control a stepping motor LDT 27, supported on a bracket from the saddle SDS2, and a tension spring (not shown) which retains the plate PL4 in contact with the actuating member of motor LDT27.

The block BL1 supports axially aligned pivot pins PV3, P4 for grating OL1 and the pivot pin PV4 has an arm PV4A attached thereto which is engaged by the actuating member of a stepping motor LDT28 supported by saddle SDS2 and a tension spring (not shown) maintains the arm PV4A in contact with the actuating member of motor LDT 28.

The grating OL1 is rotatable relative to the pivot pins P3 and P4 by a worm W, rotatably supported by block BL1 and manually actuated.

It will be seen that the above arrangement the mirror OL2 can be adjusted towards and away from the laser LS and the plane of mirror OL2 can be adjusted about vertical and horizontal axes. The axis of the pins PV3 and P4, and the pivoted axis of the block BL1 all pass through the centre of the grooved face of the grating OL1 and thus the grating OL1 can be rotated, angularly displaced about the axis of pins P3 and P4, and angularly displaced about the vertical axis of the pivot for block BL1, and its height, transverse position and linear position can be adjusted relative to the mirror OL2.

The assembly may include further horizontal guide rails parallel to rail R for example a hollow aluminum bar shaped Oriel rail, with clamping units (not shown) having two press fitted and parallel aligned, stainless-steel bars with a surface quality of Rockwell 55 to 60 on the C scale. This hardness is matched for six ball bearings (not shown) in the slider blocks. Each ball bearing is slit and can be closed by a suitable member to form a slight interference-fit rigid around the bars. All movements are spring loaded to avoid backlash. The third mirror OL2 is placed in a kinematic mount as shown in FIG. 9.

To summarize the above, each of the carriers of the MGC can be positioned with a measured longitudinal step increment of 0.44μm (backlash 0.22μm). The grating has a rotational step increment of 40μrad (8 arc sec).

In the optical set-up, two NaCl windows (one of which is seen in FIG. 9) with dimensions of 70×50×16 mm were pressure tested up to 15 atmospheres. These windows were mounted at the Brewsters' angle and connected to the pressure vessel on both ends and provided access to the gain section. This NaCl window substrate was polycrystalline material, with the added advantage of four times the elastic limit of an ordinary single crystal NaCl. It was found that the microscopic tungsten dust from P.I. pins employed in the laser was coating the windows, which caused deterioration of optical properties. To overcome this problem, the NaCl windows were shielded with internal apertures acting as dust covers. The resonator has an overall length 1.10 m and an internal aperture of 9 mm (determined by the electrodes). The optical components comprise the output coupler OL3 of 67% reflectivity and a radius of curvature of 6 meter and the suppressor mirror OL2 formed of zinc selenide, one side being uncoated with a reflectivity of 17% with the other being anti-reflection coated and wedged. This suppressor mirror was complemented with the diffraction grating (OL1), having 150 line/mm, a diameter of 25 mm, and a blaze wavelength of 10.6 micrometer in Littrow mounting to form the composite end mirror, the MGC. In our region of interest, between 9.3–10.7 micrometer, the first order reflectivity of the grating is 95% (6.10). Rewriting expression $\lambda = 2d\sin\theta$ gives a relation for the spectral gating step response $\Delta\nu$ of a rotational increment $\Delta\theta$, where v is the selected frequency of the grating, d the groove spacing and c, the velocity of light.

$$\Delta\nu = -\nu \left[ \left( \frac{2dV}{c} \right)^2 - 1 \right]^{\frac{1}{2}} * \Delta\theta \qquad [6.4]$$

For $\Delta\theta = 40$ micro rad, we have $\Delta\nu = 0.85$ GHz at $P\lambda = 10.6$ μ m. Fine frequency control is obtained by scanning the third mirror to change the longitudinal mode behaviour of the MGC.

$$\delta\nu = -\frac{c}{\lambda} * \frac{\Delta L_3}{L_3} \qquad [6.5]$$

In this case, the suppressor mirror grating distance L3 varies between 38 and 61 mm so that per motor micrometer step increment $\Delta L_3 = 44$ nm, the longitudinal step response Sv being variable between 33 MHz and 20 MHz.

By varying the short cavity length L3 the frequency gap between the individual grating steps is easily covered, so complete intertuning is obtained.

The frequency scanning of the MGC unit was tested on a 90 cm long CW-CO2 laser. The third (suppressor) mirror was not mounted in this test. The grating step response was calibrated by tuning the grating between 10P20 and 10P22 transition lines. 64 rotation steps were needed to cover this spectral region of 54 GHz, which corresponds with a rotational step-increment of 0.85 GHz.

At 10P22 two adjacent longitudinal modes were covered in 120 steps corresponding to a single step increment of 44 nm. As the FSR is 116 MHz, the longitudinal step increment (see FIG. 9) is 1.39 MHz.

Figure 10:
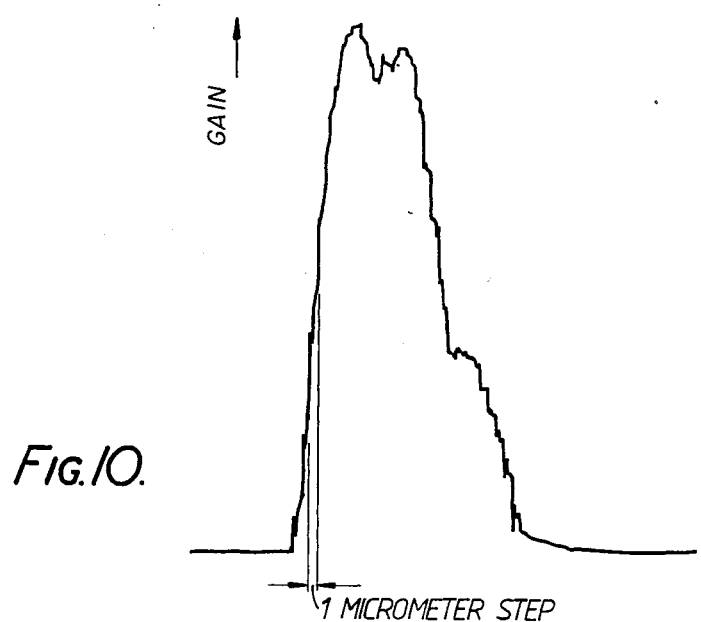
FIG. 10 is a graph of a stepping micrometer unit scan through a single mode of a C/W laser (gain plotted vertically)

This corresponds with a length increment of 44 nm (see eqn-[6.5].) The advantages are not only in storing data but in optimizing operating conditions of a laser. The digital control offers greater flexibility with the software generated algorithms and replaces the lock in amplifier based analog circuitry. If the laser is deliberately misaligned, the longitudinal mode scan, e.g. FIG. 10, shows a triple maximum due to transverse modes. This could be used as a diagnostic for automatic cavity alignment. The optics altering the laser characteristics can be controlled continuously. In particular, slow thermal drifts are easily compensated, simplifying cavity design and making INVAR alloy or other passive stabilization structures obsolete.

At present the laser world has not recognized the wavemeter mode at which the resonator is scanned repetitively. The number of steps between the adjacent maximum output power of the laser is recorded and/or averaged up until enough data is collected to predict the actual emission wavelength of the passive or active resonator. It is also possible to use a wedge etalon and accurately record the distance of two or more adjacent transmission and/or reflection maxima with any matrix detector (e.g. a linear array detector). Next to this, it is possible to combine the information described above in order to correct the orientation of the resonator elements involved (e.g. iris(es), mirror(s), output coupler(s), beamsplitter(s), phase conjugate mirror(s), grating(s), scanner(s), or other wavelength selective components like absorption cell(s) and etalon(s)). This is to optimize and influence the beam propagation characteristics such as emitted mode structure (transverse and/or longitudinal), beam-divergence, and beam profile, which is especially important for unstable resonators. Also, it allows a resonator to be bootstrapped (all components involved to be corrected under computer control).

Figure 11:
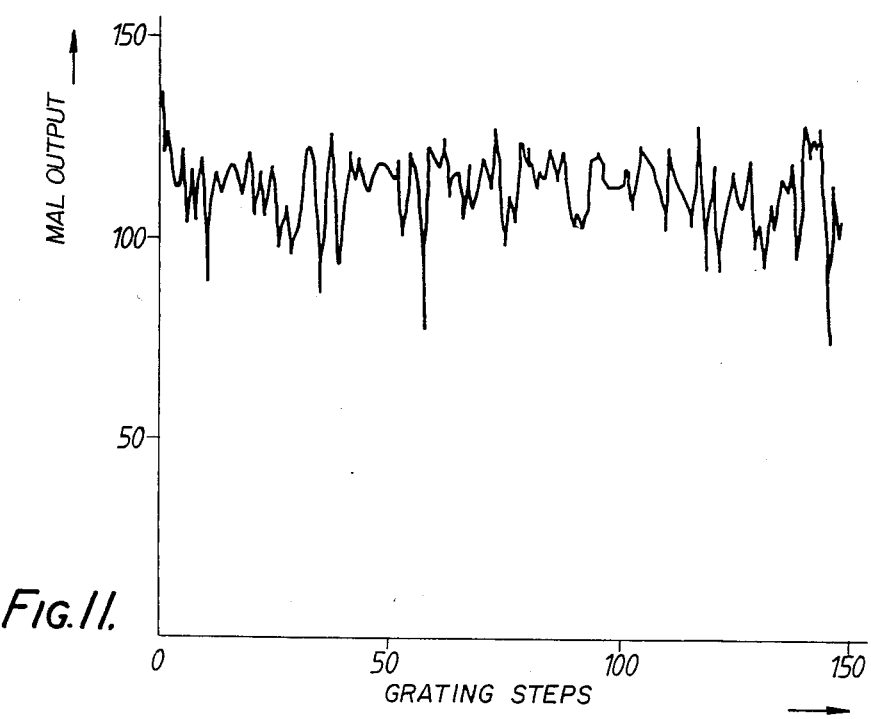
FIG. 11 is a graph of a stepping micrometer unit scan through a single mode of a C/W laser (MAL output [mJ] plotted against grating steps).
Figure 12:
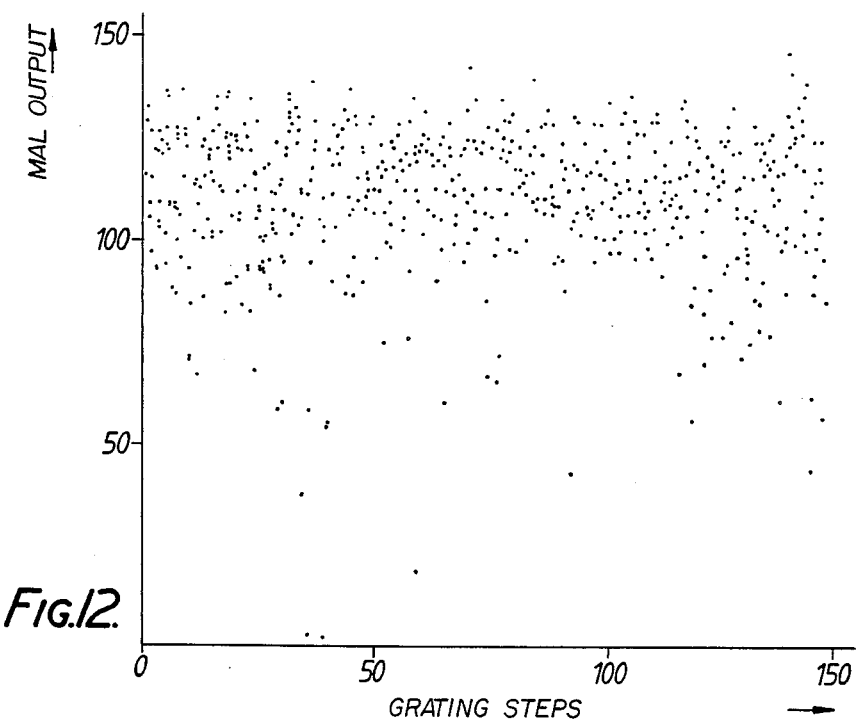
FIG. 12 shows in graphical form the data from which the graph of FIG. 11 is derived.
Figure 13:
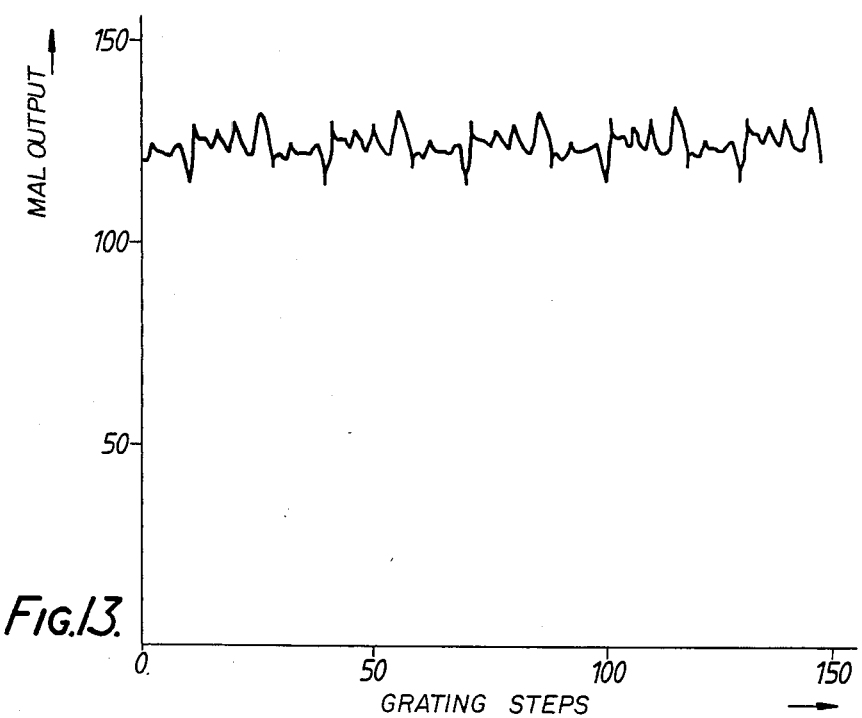
FIG. 13 is a graph of a MAL under specified conditions (MAL output [mJ] plotted vertically against grating steps)

With a fixed grating position at the peak of the 10P20 transition, the fine frequency tuning of the MAL output at 8 atm. operational pressure was evaluated, as a function of the suppressor mirror position, with a short cavity length of 38 mm (see FIG. 11), and spectral step response of 33 MHz. FIG. 11 shows 110 undirectional third mirror steps with four averaged output power shots at each step position. The results displayed in FIG. 11 are software brushed to cancel the powerless or arc shots. The initial power drop is due to the heating of the discharge medium followed by a weak periodic modulation which corresponds with the free spectral range of the third mirror, due to the variable reflectivity of the MGC. An illustration of the raw data is given in FIG. 10 and emphasises the fluctuations in output power, which can be explained by the jitter between the P.I. and main discharge sparkgaps employed. The periodic behaviour is confirmed with a long third mirror scan (TMS) covering five free spectral ranges with an increment of 5 steps or 5×44 nm and the average of 25 laser shots per increment (FIG. 13). It also illustrates a reproducible ripple on the produced output power which is probably introduced by a small realigning effect of the cavity during the TMC scan.

In normal circumstances the trigger for the P.I. and/or main discharge is far more reliable (by using e.g. a thyratron instead of the used spark plug triggered spark gap). However, with this method it is in principle possible to isolate the qualities of the position unit, e.g. ball bearing qualities and/or other mechanical jitter effects. Knowing these deficiencies in a quantified way, it is in principle possible to correct them.

Figure 14:
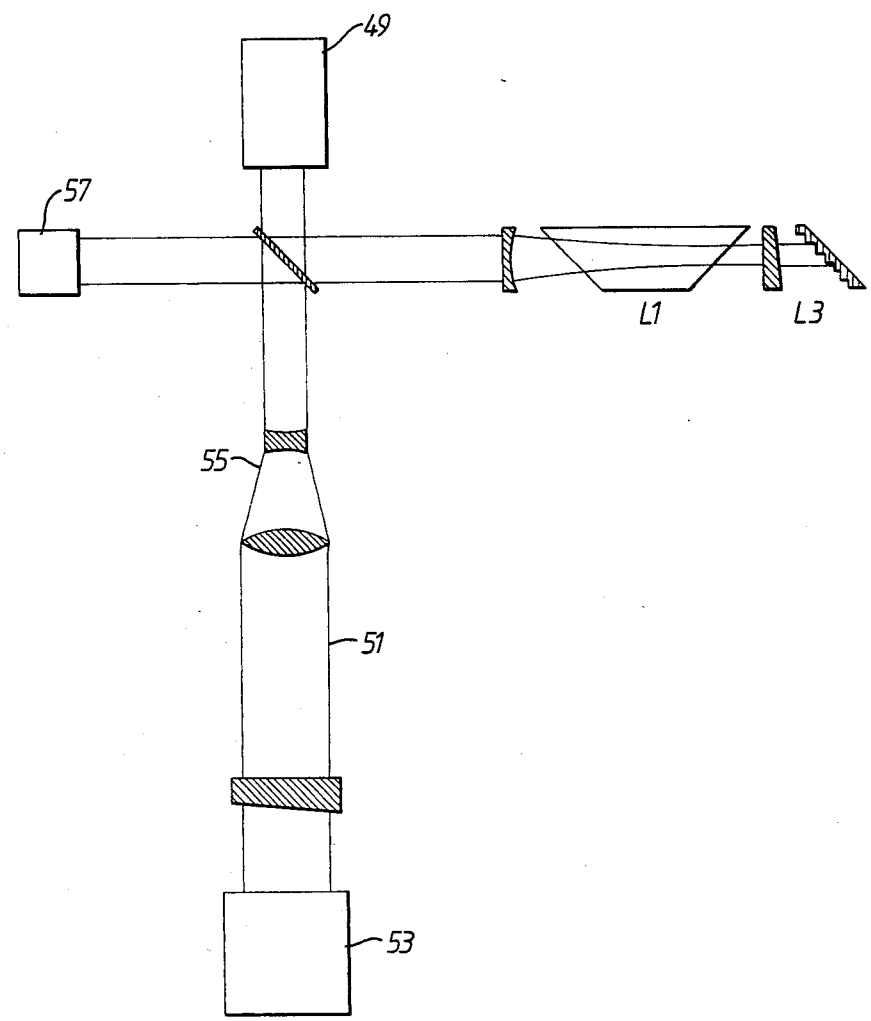
FIG. 14 is a diagram of a MAL output characterization apparatus employed in the preferred embodiment.

In order to characterize the result line width characteristic of the MAL, the following complementary diagnostic tools were used (see FIG. 14).

The absolute frequency was measured approximately with a 2.3 meter long optical Engineering spectrometer (49) using the diffraction properties of a grating with a resolution of 0.3 cm$^{-1}$(9 GHz).

The wavelength is found by observing a calibrated carbon plate which lights up on the impact of a CO2 laser pulse.

Figure 15:
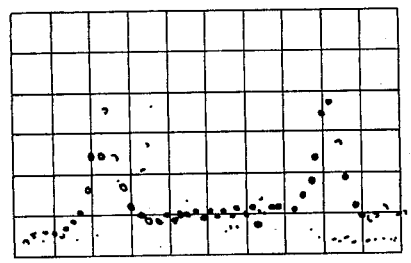
FIG. 15 is a oscillogram of an interferometer calibration of a SLM $C_2$ CW laser transition.

The linewidth of the MAL was tested with a Fizeau interferometer (51, FIG. 14), a wedged etalon which creates linear fringes that are easier to observe, using linear array detectors, than the circular fringes from a plane parallel etalon. The wedged etalon was a germanium slab of thickness 10 mm, diameter 25 mm, and refractive index n=4. The wedge angle was 1 min. and the surface reflectivity was 80%. The resulting Fizeau interfermoneter characteristics are a free spectral range of 3.75 GHz and a finesse of 14 (see FIG. 14). A low pressure CO2 laser (Edinburgh Instruments type PL2) was tuned on to the 10R14 SLM transition. The output was chopped and used to calibrate the wedge fringes. This output was also chopped and passed through a beam expander (55) before the etalon and observed using the array detector (Delta Developments). The array detector comprised fifty, 20 $\mu$m wide, pyro-electric elements, the output of which was coupled to a Tektronix 7623 storage oscilloscope. The two peaks on FIG. 15 enclose the FSR of the wedge to be established a corresponding 30 dots, so the spectral response of the etalon is 125 MHz per dot. The resolution of the CW laser linewidth is ≈1 MHz opposed to the several dots i.e. ≈500 MHz.

Consequently, it is not suitable to detect the longitudinal modes in the MAL. Finally mode beats at the intermediate frequencies of 136 MHz showed with the output of a CdHgTe detector 57 (a R005 PC detector from Labimex, Warsaw) displayed on a Tektronix 7844 scope having a 1 GHz bandwidth (see FIGS. 40 and 41). The array detector output can form part of the computer input with or without the wedge etalon.

Figure 16:
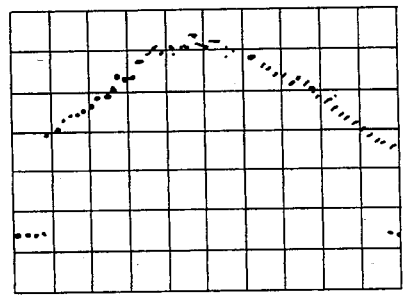
FIG. 16 is an oscillogram of a calibration of a transverse mode behaviour of the mirror/grating combination optical system of the preferred embodiment.
Figure 17:
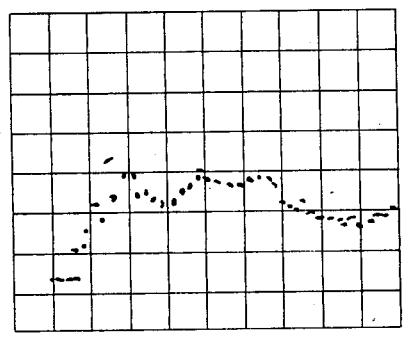
FIG. 17 is an oscillogram of a calibration of the longitudinal mode behaviour of the optical system of the preferred embodiment using a wedge etalon.
Figure 20:
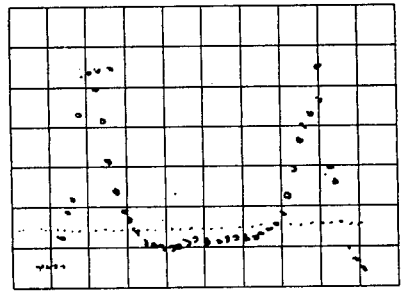
FIGS. 20 to 35 respectively are oscillograms presenting a sequence of Fizeau wavemeter outputs of the MAL.
Figure 21:
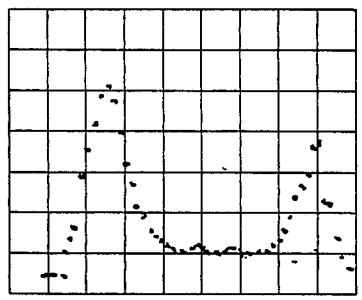
Figure 22:
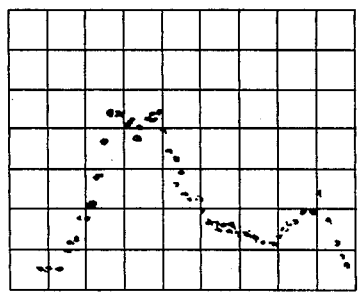
Figure 23:
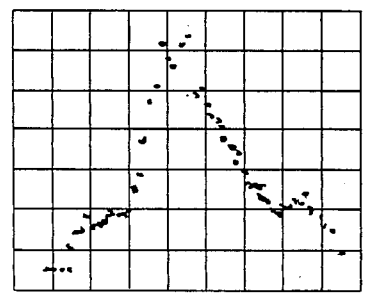
Figure 24:
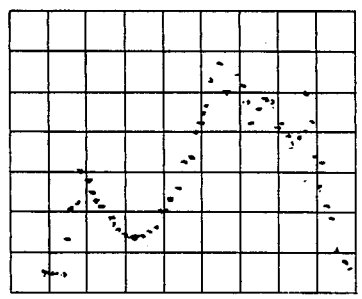
Figure 25:
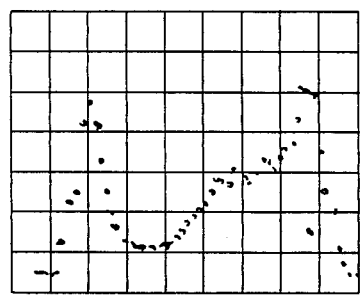
Figure 26:
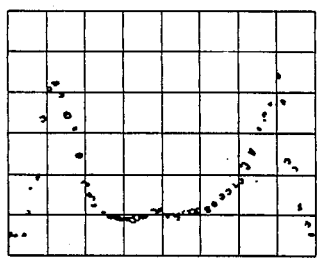
Figure 27:
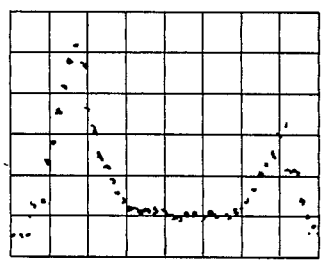
Figure 28:
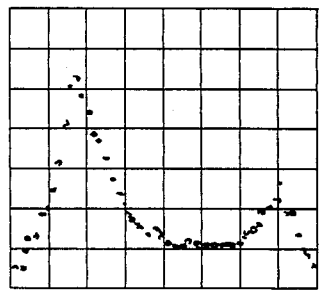
Figure 29:
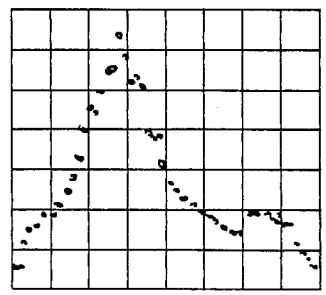
Figure 30:
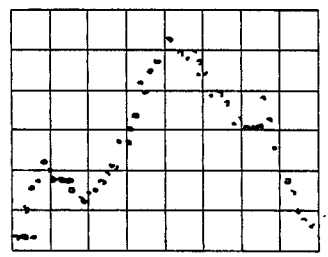
Figure 31:
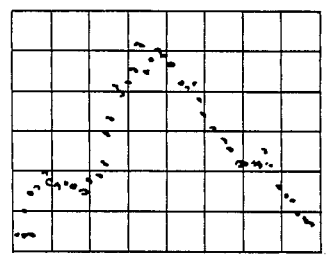
Figure 32:
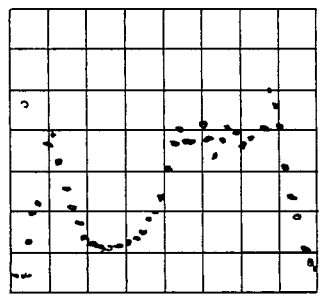
Figure 33:
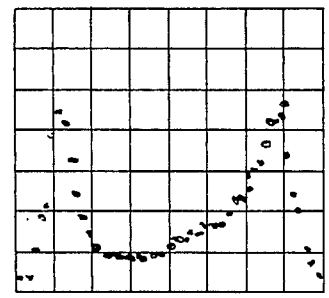
Figure 34:
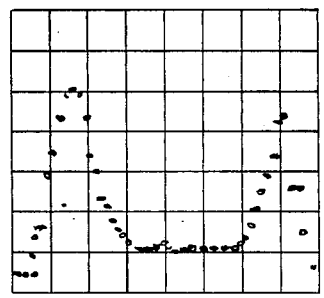
Figure 35:
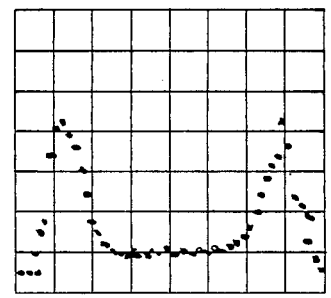

Initially, the spectral behaviour of the grating, without the auxiliary mirror in the MAL resonator, was examined on the 10P12 line. Two figures, FIGS. 16 and 17, respectively show the output of the laser without and with the wedge etalon in front of the array detector. FIG. 16 shows that the longitudinal spectrum is wider than the FSR of the wedge etalon and indicates that the axial mode competition alone does not provide the desired linewidth and makes some form of mode selection essential. FIG. 17 shows the profile of the beam (approximate Gaussian) and is needed to calibrate the absorption plots. Similar results were obtained when a germanium suppressor mirror was used as the third mirror in the MAL cavity.

Figure 18:
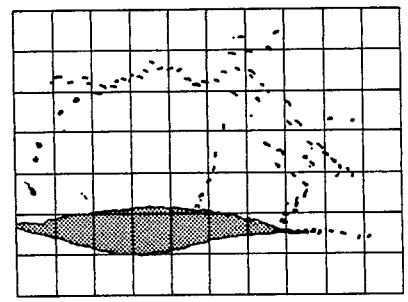
FIG. 18 is an oscillogram of a transverse mode behaviour of the MAL of the preferred embodiment.
Figure 19:
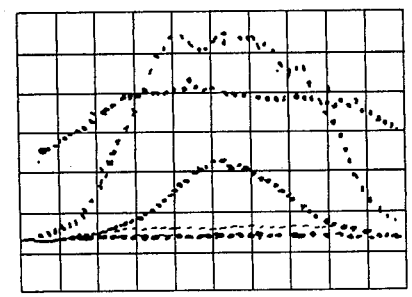
FIG. 19 is an oscillogram of a further transverse mode behaviour of the MAL.

After the installation of the zinc-selinide suppressor mirror the array detector was first used without the wedge etalon to investigate the beam profile with different apertures in the cavity (see FIGS. 18 and 19). The distance between the laser and the etalon was 0.5 meter. FIG. 19 shows that the gaussian beam shape in the horizontal plane does not depend on the aperture, although FIG. 18 indicates secondary modes in the vertical plane, due to a bouncing mode from the electrodes. If the array detector was moved further away from the laser (3 meters), the secondary modes could not be observed. These preparations are necessary to investigate the longitudinal mode structure of the MAL, which follows. To optimize the axial mode rejection ratio, a minimum short cavity length of 61 mm was first used. The FSR of the short MGC cavity was scanned by moving the third mirror with a unidirectional increment of 20 DLT steps, i.e. 660 MHz. At each parked position an array detector output picture freezes the longitudinal mode behaviour of the MAL. This is illustrated in FIG. 20 to FIG. 35 inclusive.

Figure 36:
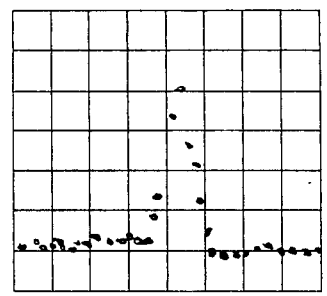
FIGS. 36 to 39 respectively are a series of oscillograms showing the isolated mode behaviour of the optical system of the embodiment.
Figure 37:
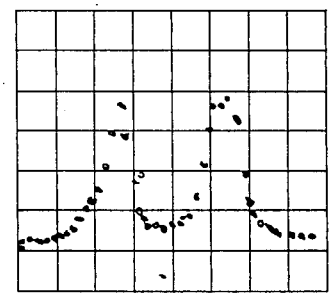
Figure 38:
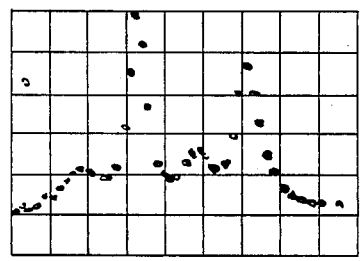
Figure 39:
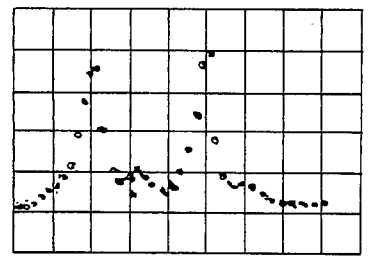

This scan (300 steps or $15 \times 660$ MHz $\simeq 10$ GHz) is 2.5 times the FSR of the third mirror cavity and only 3 times the FSR of the wedge etalon. In particular there was observed the narrow output linewidth exhibited in, e.g., FIGS. 20 and 21, and by contrast the hidden spectrum captures in, e.g.,, FIGS. 24 and 31. In the former, two peaks appear at a separation corresponding to the FSR of the wedge, as with the CW laser (see FIG. 10). Minimizing the short cavity length optimizes the mode rejection ratio. At a nominal short cavity distance position of 38 mm. the third mirror scan was represented with respectively 0, 55, 65, and 120 DLT steps. During this scan the frozen longitudinal mode pictures are better and show isolated mode clusters (see FIGS. 36 and 37). In the FIGS. 38 and 39, there is a suggestion that laser action in a secondary mode cluster is just permitted.

Figure 40:
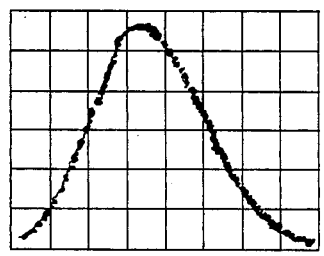
FIG. 40 is an oscillogram of a plane MAL mode beat output pulse as recorded by a CMT detector.
Figure 41:
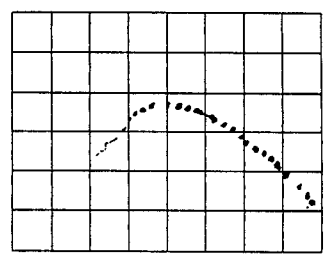
FIGS. 41 and 42 respectively are oscillograms of an adjacent mode beat output pulse.
Figure 42:
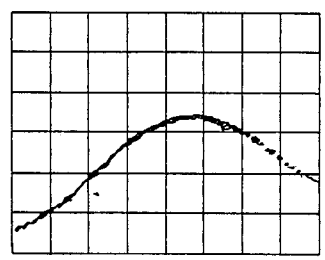

The pulse profile of the MAL was displayed on the Textronix 7844; FIG. 40 shows the characteristic mode beat effect of the detector. In FIGS. 41 and 42 the obtained pulses show a higher resolution and were taken simultaneously with data of FIGS. 37 and 38. Measurements from FIG. 41 suggest a resulting beat frequency of 133 MHz and, from FIG. 42, a 140 MHz beat frequency. These are close to the adjacent 136 MHz beats of the two long resonator modes. This multi-moding is convenient because the long cavity does not have to move in step to keep the TMC in tune.

The interaction of a molecular gas with infrared radiation is of considerable interest for measuring atmospheric species. The absorption depends upon the change in the dipole moment between the vibrational and rotational levels of a particular transition and the half width of a line. Ethylene was employed to demonstrate the tuning and locking characteristics of the laser because it is relatively insensitive to saturation effects. Ethylene measurements require normally a low irradiance $\simeq 1$ W/cm, which demands attenuation such as by telescopic beam expansion and cooled detector technology to perform accurate measurements of the temperature and pressure dependence of the isolated species.

The complete laser transmitter system comprises the computer with the Eurocard subrack system, computer disc drives, and LDT controller box, and optical components such as beam aligners, absorption cell and array detector. The tubular rail optical system is supported with three independent tripods (not shown). The MAL, laser LS with the trigger unit TU (see FIG. 66) on top is supported by one tripod not shown and is isolated with Teflon washer to avoid earth loops with the other electronic equipment such as the HeNe lasers, computer controlled cavity, detectors and optical spectrum analyser.

Three parallel rails (not shown) are provided at the front of the laser support base for the absorption cell vacuum equipment. Alignment equipment runs parallel to the longest rail below the optical axis. The detector mounts are covered with a PTFE tape to avoid earth loops between the individual computer driven components. The MGC unit did not need isolation as the connection to the linear Oriel transducer was isolated from the chassis.

Figure 49A:
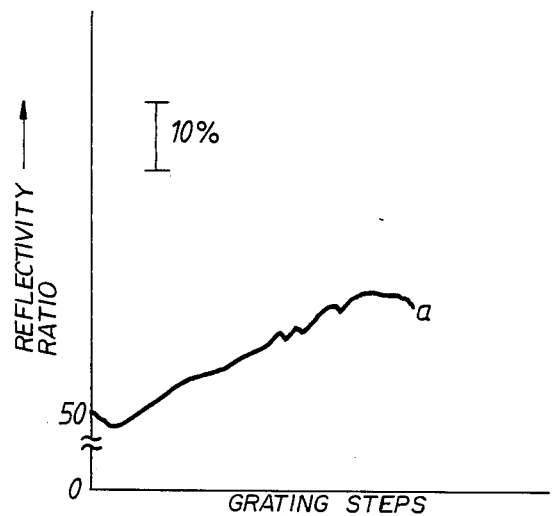
FIGS. 49 (a), (b), and (c) respectively are graphs of spectral characteristics using different beam splitters at the output of the laser of the preferred embodiment (Reflectivity ratio [%] plotted vertically against grating steps)
Figure 49B:
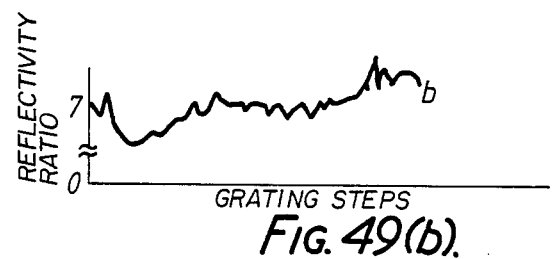
Figure 49C:
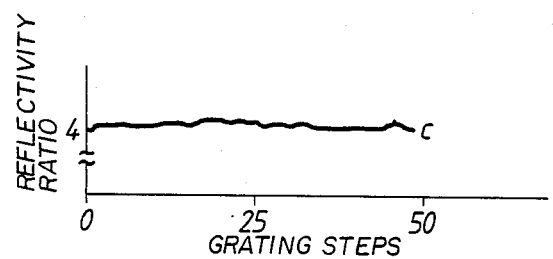
Figure 50:
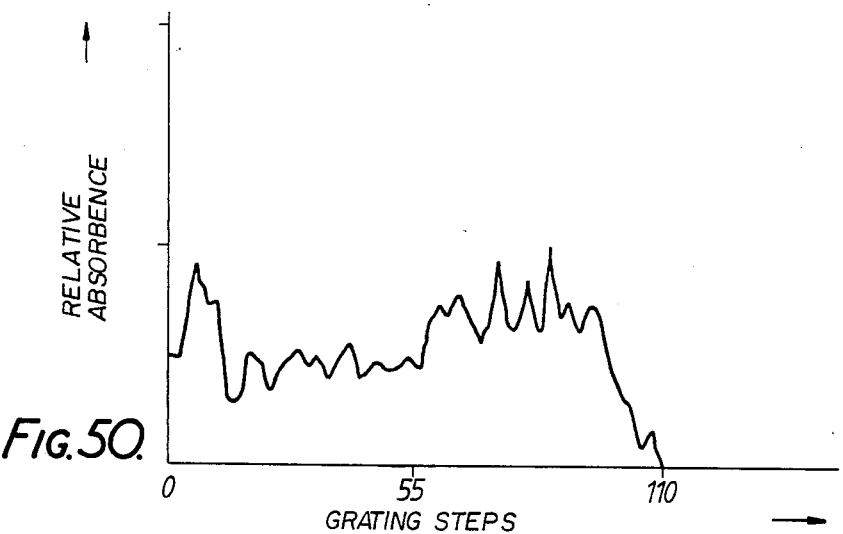
FIGS. 50 to 53 respectively are plots of absorption scans of ethylene (relative absorbence plotted vertically against grating steps)
Figure 51:
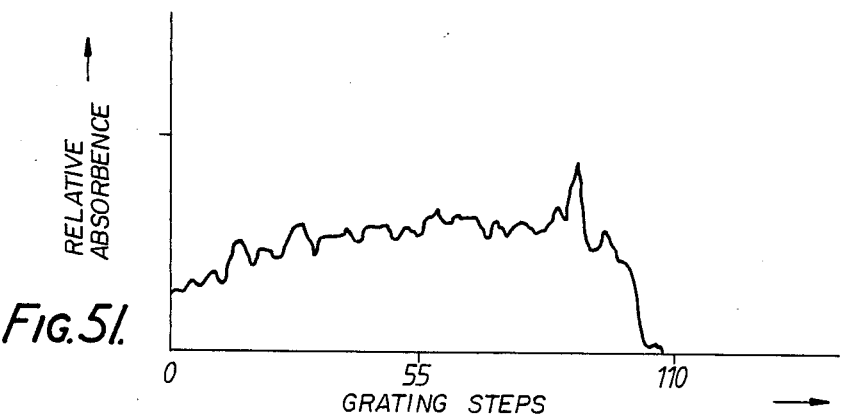

The laser radiance before the absorption cells was restricted to 5 KW/cm$^2$ to avoid saturation effects near the $10_{P14}$ emission line. The absorption was observed in a 10 cm long aluminum cell with NaCl Brewster input and output windows. A beam splitter (53) was used so that the laser output energy E1 and E2 transmitted through the absorption cell Ac could be monitored simultaneously (see FIG. 1). FIGS. 49 $a$, $b$, and $c$ represent the experimental dependence of the ratio E/E obtained using three different beam splitters as the laser frequency is scanned by rotating the cavity grating. The three beam dividers of FIGS. 49($a$), 49($b$), and 49($c$), are, respectively, a 50/50% germanium beamsplitter, a polished plane parallel salt flat, and a salt flat one side of which is polished and the other roughened. The three figures indicate that the multiple reflections produced within the Ge plate (despite the AR coating on one of its surfaces) and the polished salt flat produce interferometric fringes which modulate the output power, since the single-sided reflector and opposite-sided scatter target were used as a beam divider (BD). This data is significant in that it shows that a BD should never be used in infrared DIAL systems.

Figure 52:
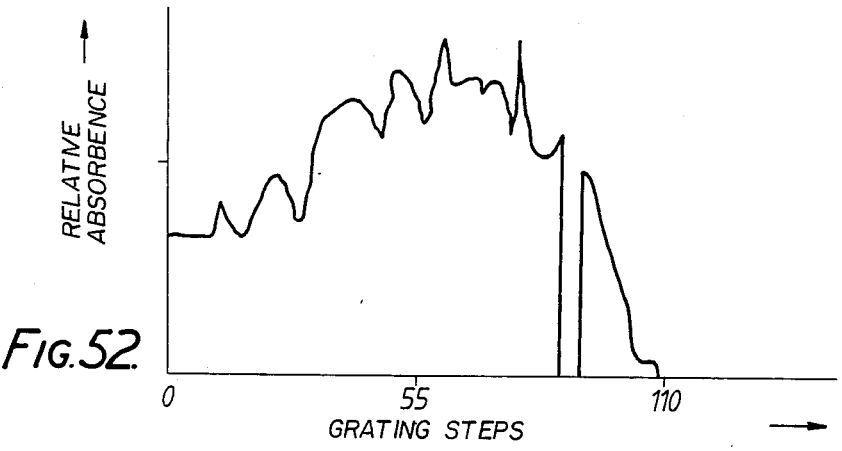
Figure 53:
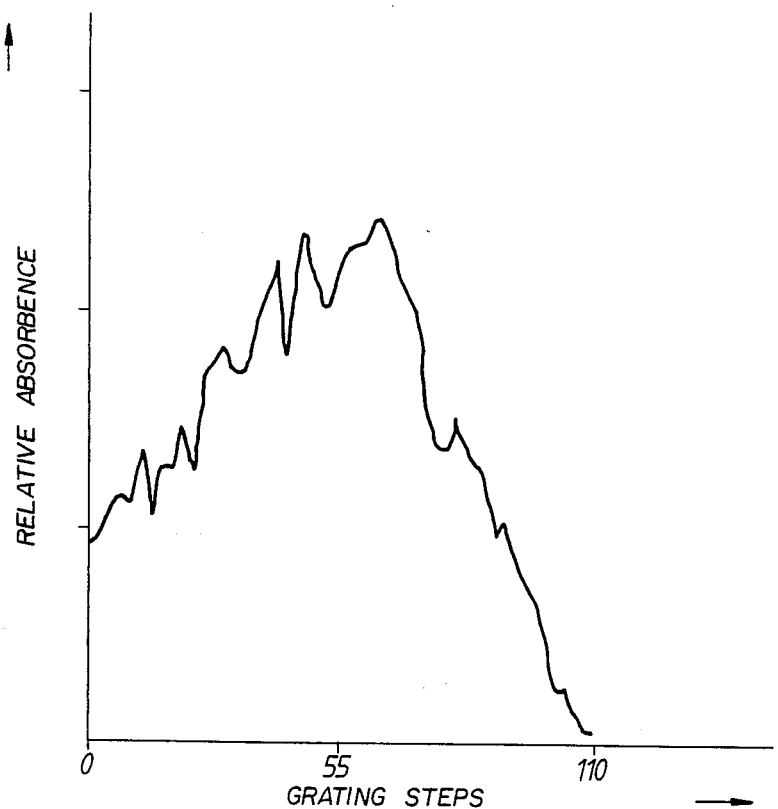
Figure 54:
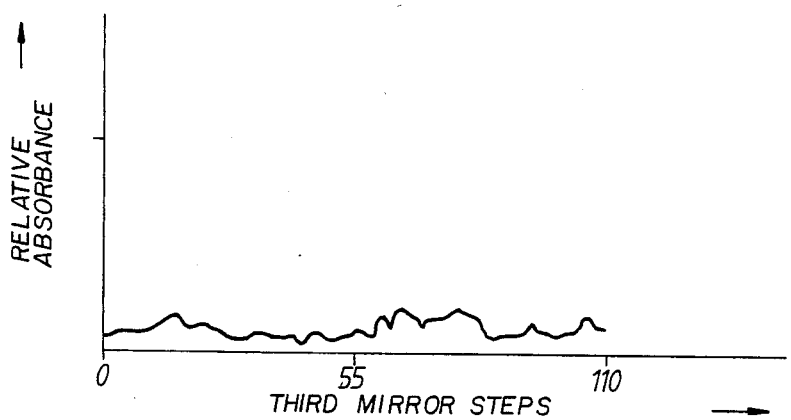
FIGS. 54 to 57 respectively are plots of absorption scans of an isolated ethylene line (relative absorbence plotted vertically against third mirror steps)
Figure 55:
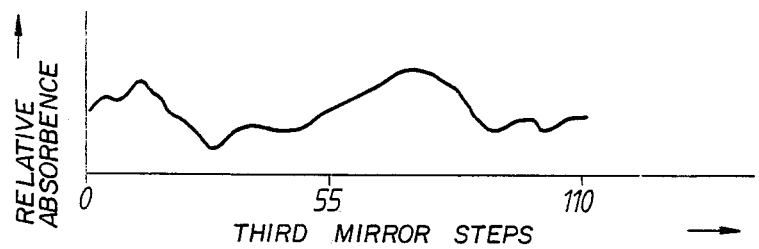
Figure 56:
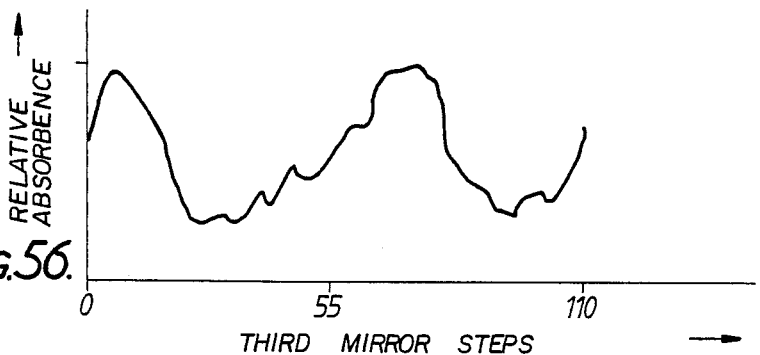

To obtain the broadbanded C2H4 spectrum, the grating position was changed over 42.5 GHz (50 grating steps) near the 10P14 transmission line. The spectra shown in FIG. 50 to 53 inclusive, were obtained with pure ethylene at pressures of respectively 0.5, 2.5, 5.0 and 7.5 mbar. The quantity plotted is the absorbance ln (E/E). All displays show the average of the four values obtained at each grating or third mirror position and compensate for the empty cell losses. Where an arc occurs (no laser output) all data are rejected. An example of the occurrence of four consecutive arcs is shown in FIG. 52. The grating scan appears to be more irregular, due to the structure in the spectrum over this frequency range, which is not apparent in the following LTMC scans. FIGS. 54 to 57 inclusive show examples of the high resolution LTMC absorbance scans of ethylene near the 10P14 and CO2 lines, respectively, at 0.7, 1.5, 3.5 and 7 mbar.

Figure 58:
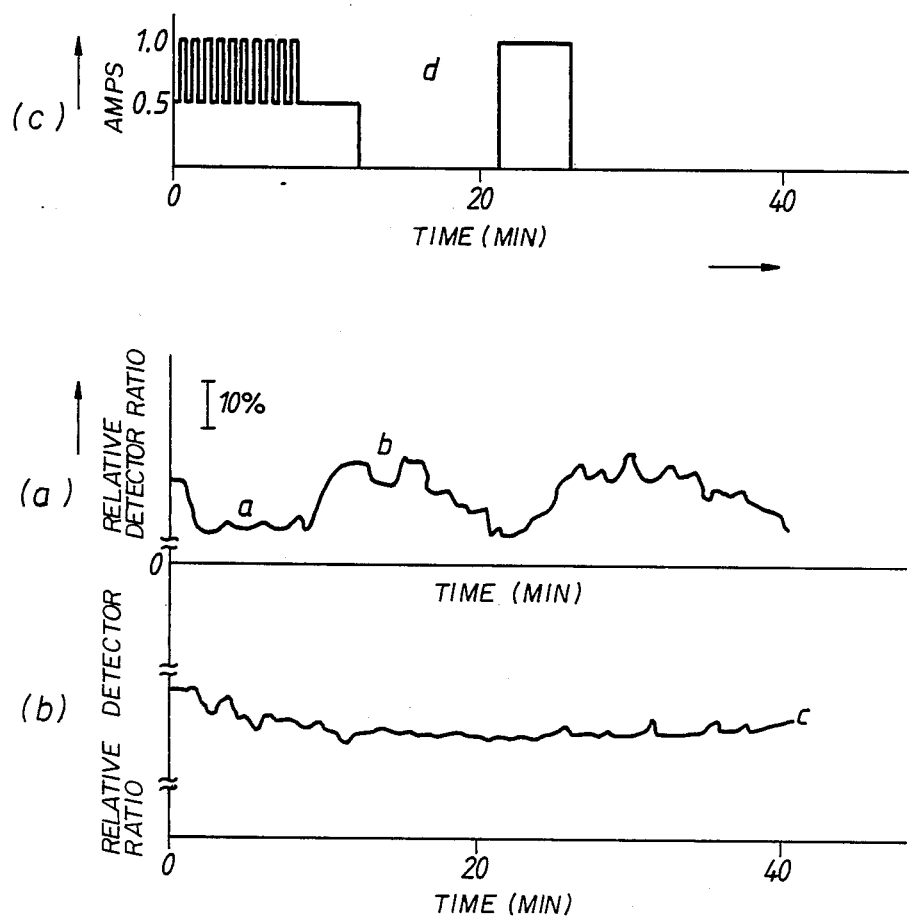
FIGS. 58 (a) to (c) respectively are plots of the absorption line under different conditions.

The pulse to pulse frequency variation of the MAL has been minimized by repositioning the third mirror using as a reference the absorption signals of ethylene described above. Other locking systems use heterodyne or dither techniques. These are only examples of feedback signals. Others include, e.g., opto-acoustic cell(s), opto-galvanic cell(s), (CW and/or pulsed), etalons, optical spectrum analyers, wedge etalons. These signals can be used and provide in part and/or in full the input for the feedback to control a position. To introduce a collective name, the term "position transducer" is used to predict any absolute or relative position with, e.g., inductive and/or capacitive and/or optical and/or pressure transducers, to act as input to position or move a linear and/or non-linear collector with or without computer control in a 3-dimensional or 2 dimensional or 1 dimensional way. The frequency locking stability observed here is established to be $\simeq 20$ MHz, using the edge of the ethylene absorption line at a pressure of 7 mbar (see FIG. 57), which is adequate for DIAL (differential absorption laser) use. Intrapulse contributions (chirp) can be neglected at this level. To obtain a first impression the frequency behaviour is examined at a fixed manually preset resonator position (see FIG. 58a) and compared with the behaviour when the LDT is activated (see FIG. 58b). Two aspects are significant:

After manual positioning the long term drift (20 minutes) of the LTMC is very slow and the absorption almost static, as indicated by line c in FIG. 58b; when dithering the third mirror (with the LDT activated) the ratioed output is again almost static, but when the main current in the LDT 26 is altered (at point d in FIG. 58c), the reflector position changes, with a frequency drift at a maximum rate of 1 MHz/sec.

Figure 59:
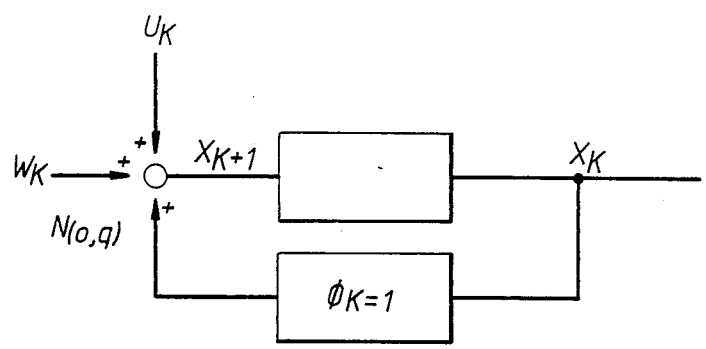
FIG. 59 is a diagram of a MAL measurement model schematic.

In control theory, a Kalman filter based feedback is quite common. A system model useful for describing the cavity length or output frequency of the MAL is depicted in FIG. 59.

The system model is defined with the following equation.

$$X_{K+1} = X_K + W_K + U_K$$

where stated variable X is the frequency and $W_K$ is a simple form of white noise with a variance given by $Q/U_K$ which describes the cavity disturbance discussed above. $U_K$ describes the control input used at various times to change the frequency, which is done in practise by moving the third mirror. In the absence of a control input the equation describes a random walk. The laser provides no direct way to feed the above signals into the computer so an absorption cell measurement is used to monitor laser frequency.

Figure 57:
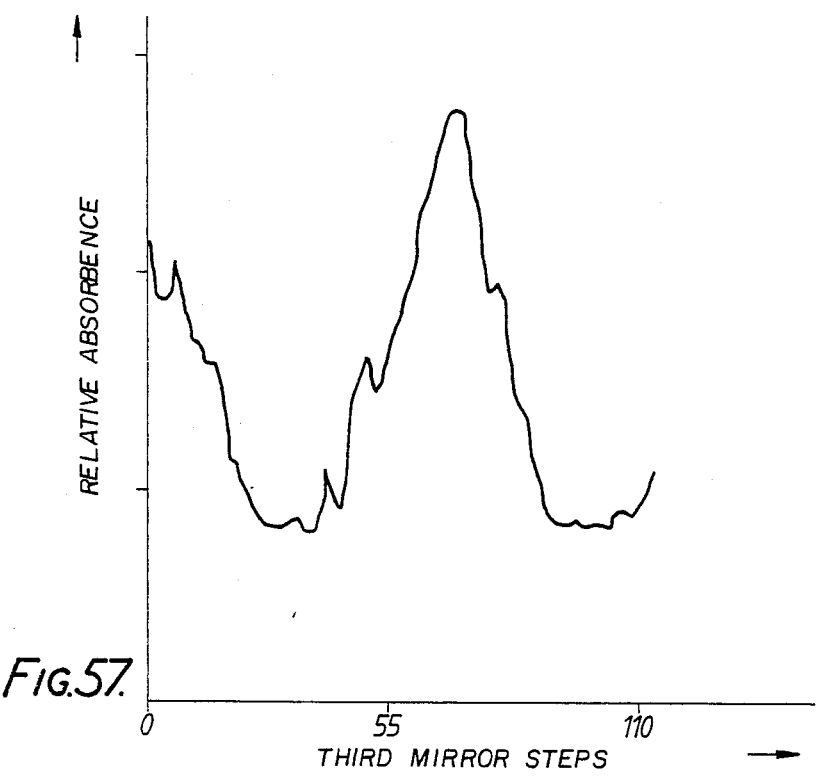
Figure 60:
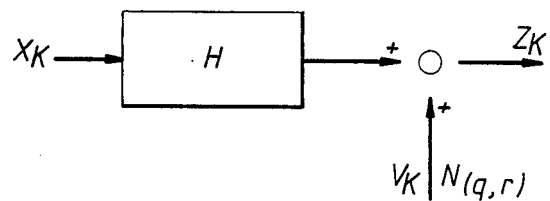
FIG. 60 is a diagram of a MAL estimation schematic.

A representation of the measurement model is shown in FIG. 60. The measurement of the absorbance ratio before and after the absorption cell can be formulated as follows:

$$Z_K = H X_K + V_K$$

where $V_K$ is the measurement noise due to disturbance such as electronic noise, digitizing noise, and V has a variance denoted by R. H is a constant relating the absorbance to the laser frequency and is obtained from a calibration spectrum such as shown in FIG. 57.

It is common to marry the above divorced diagrams and to introduce the use of a computer to keep track of the required signals.

Figure 61:
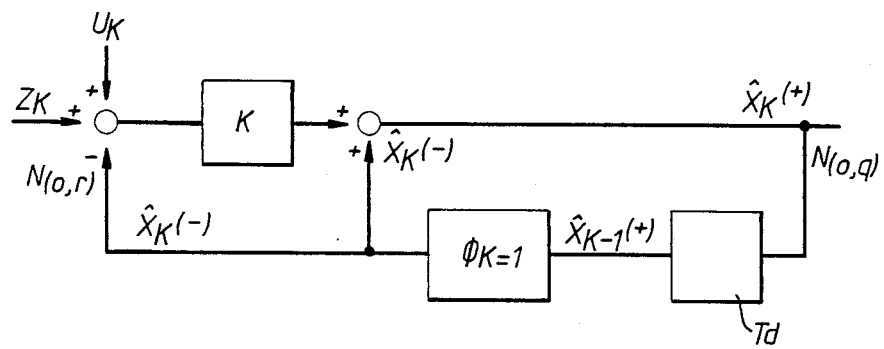
FIG. 61 is a diagram of a discrete MAL model.
Figure 62A:
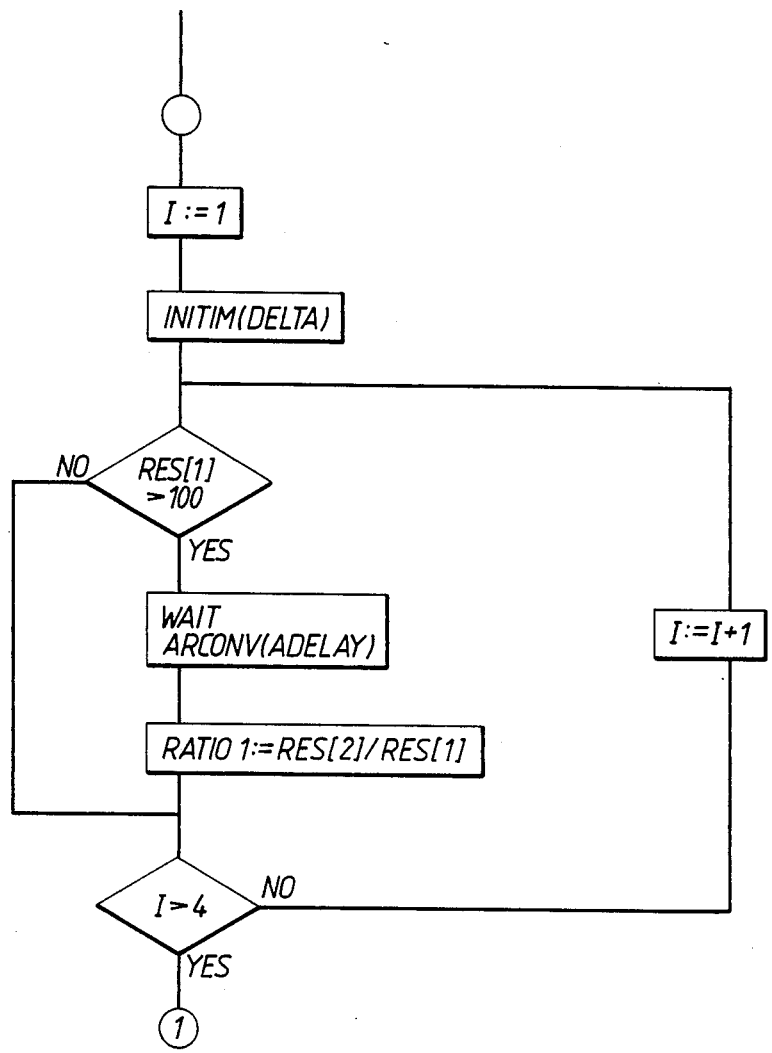
FIGS. 62 (a) to (g) are collectively a flow chart of an active control of the optical system of the embodiment.
Figure 62B:
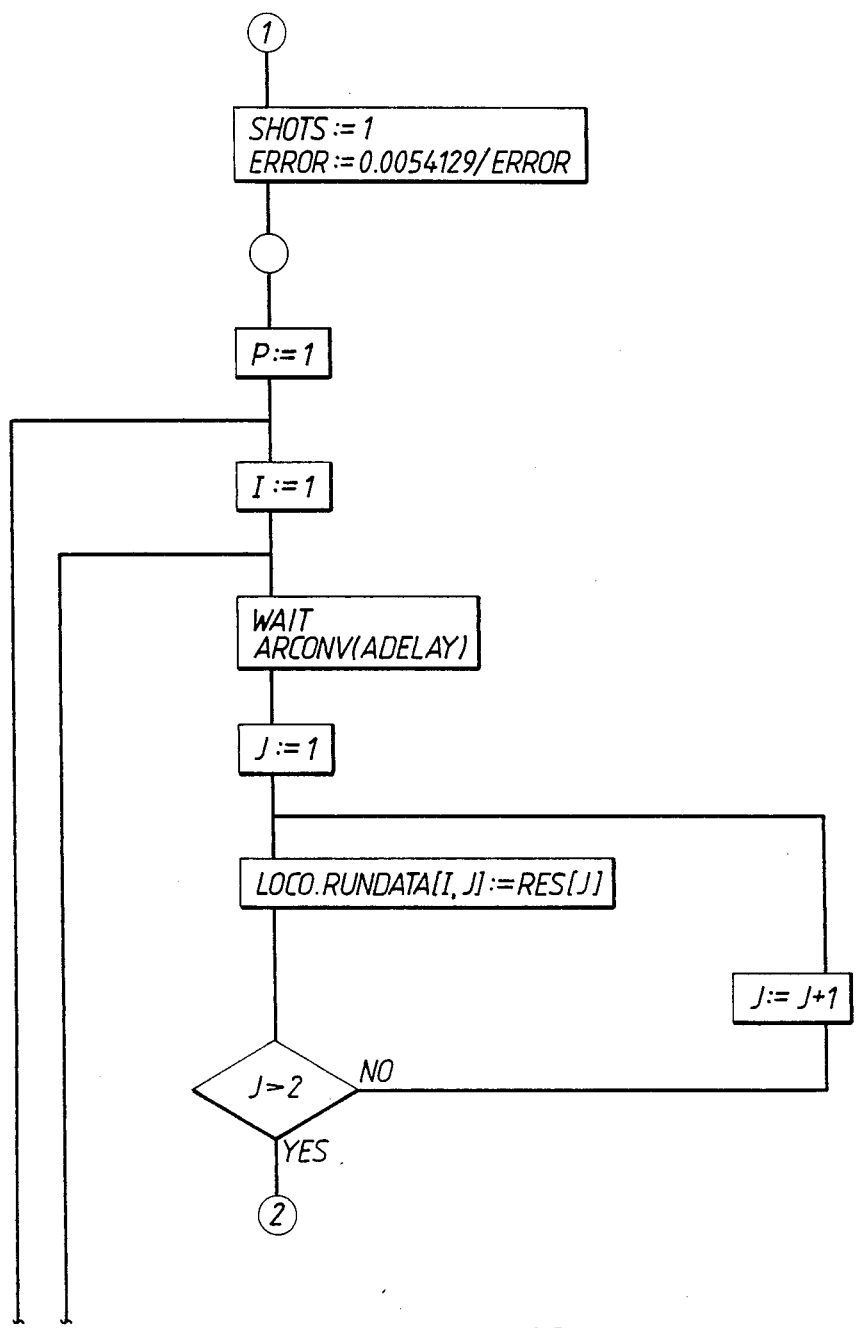
Figure 62C:
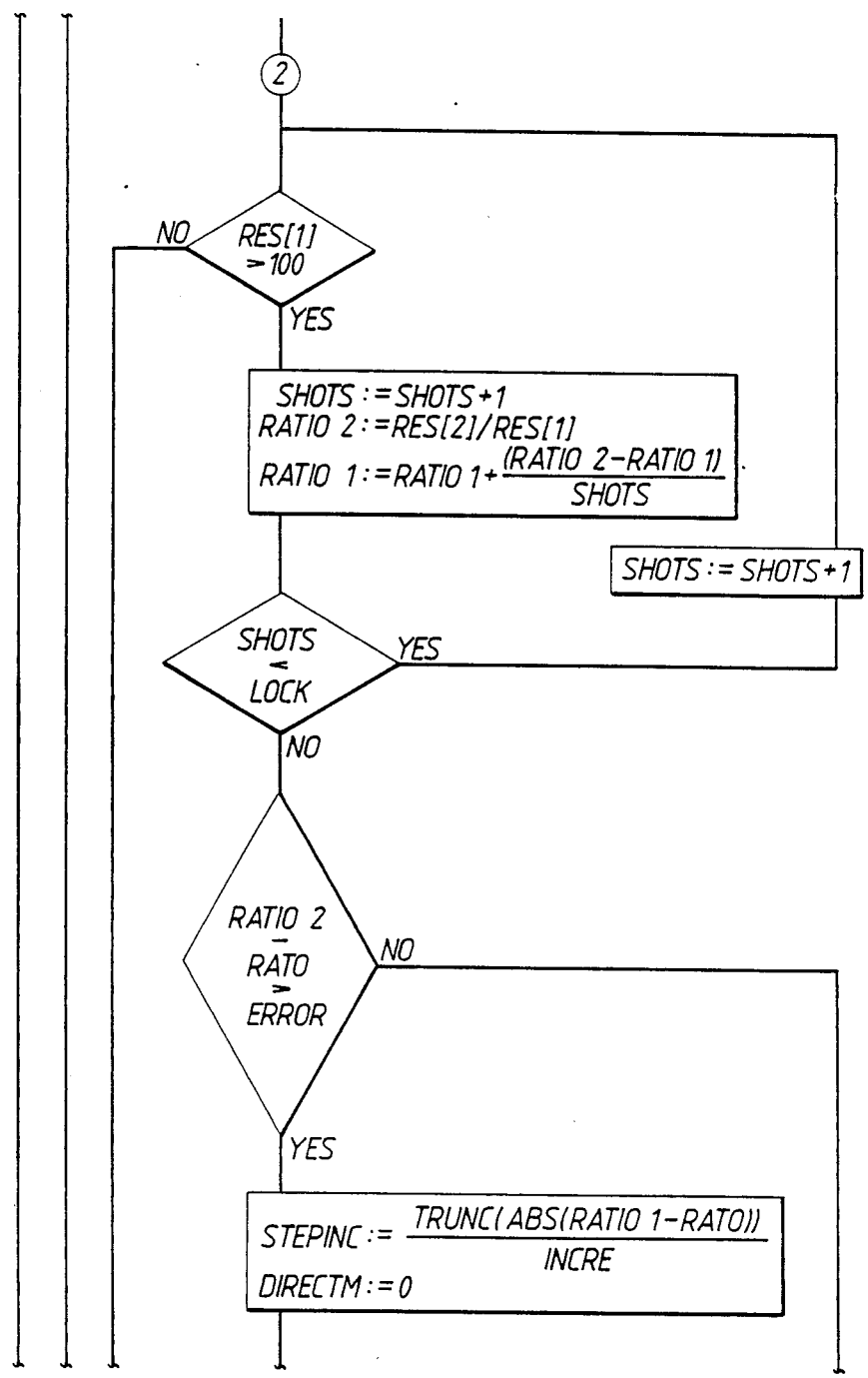
Figure 62D:
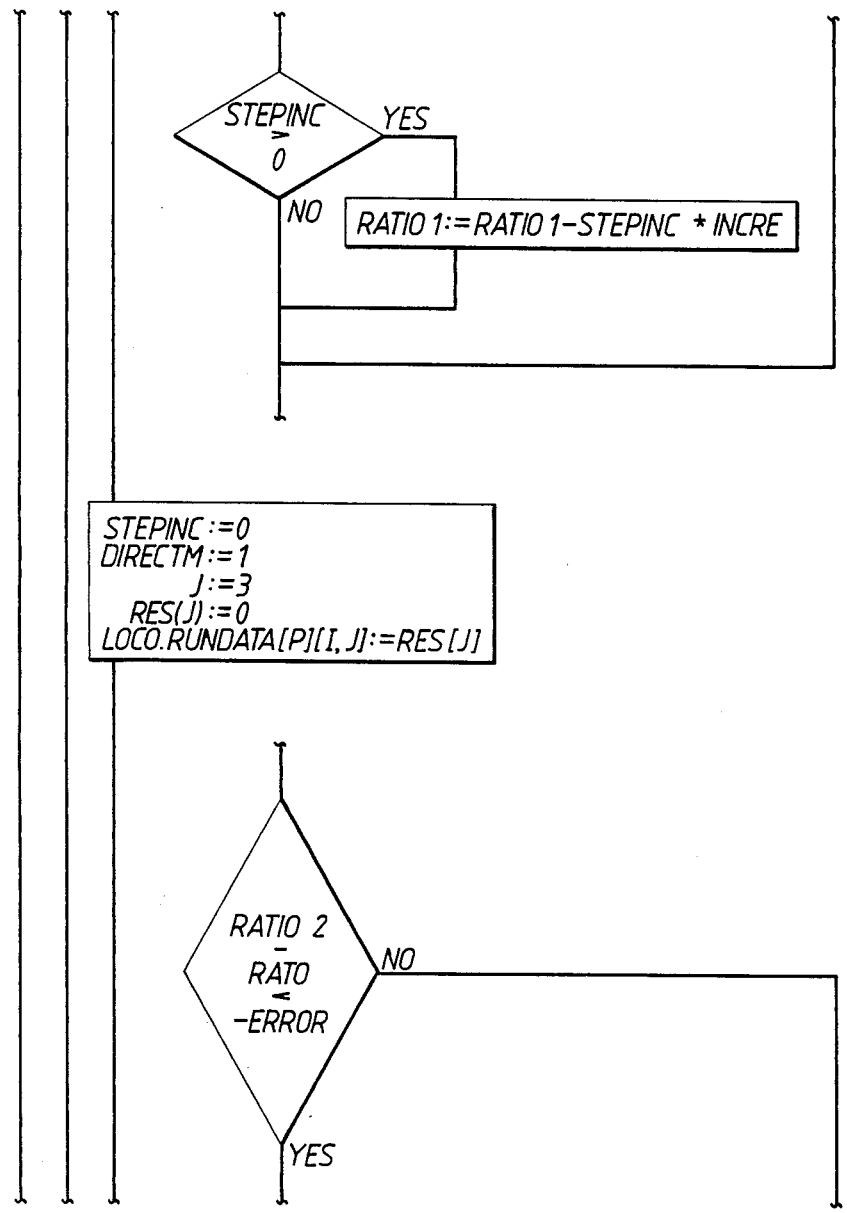
Figure 62E:
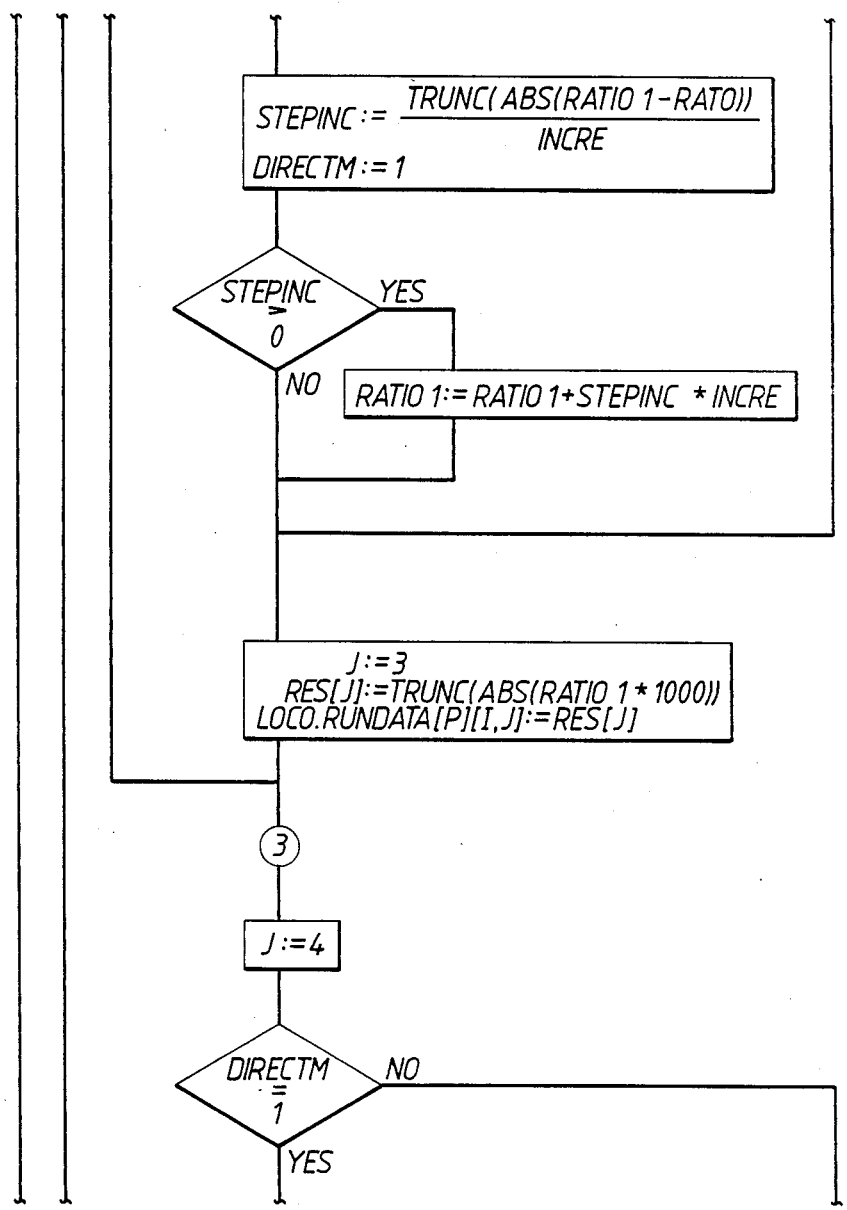
Figure 62F:
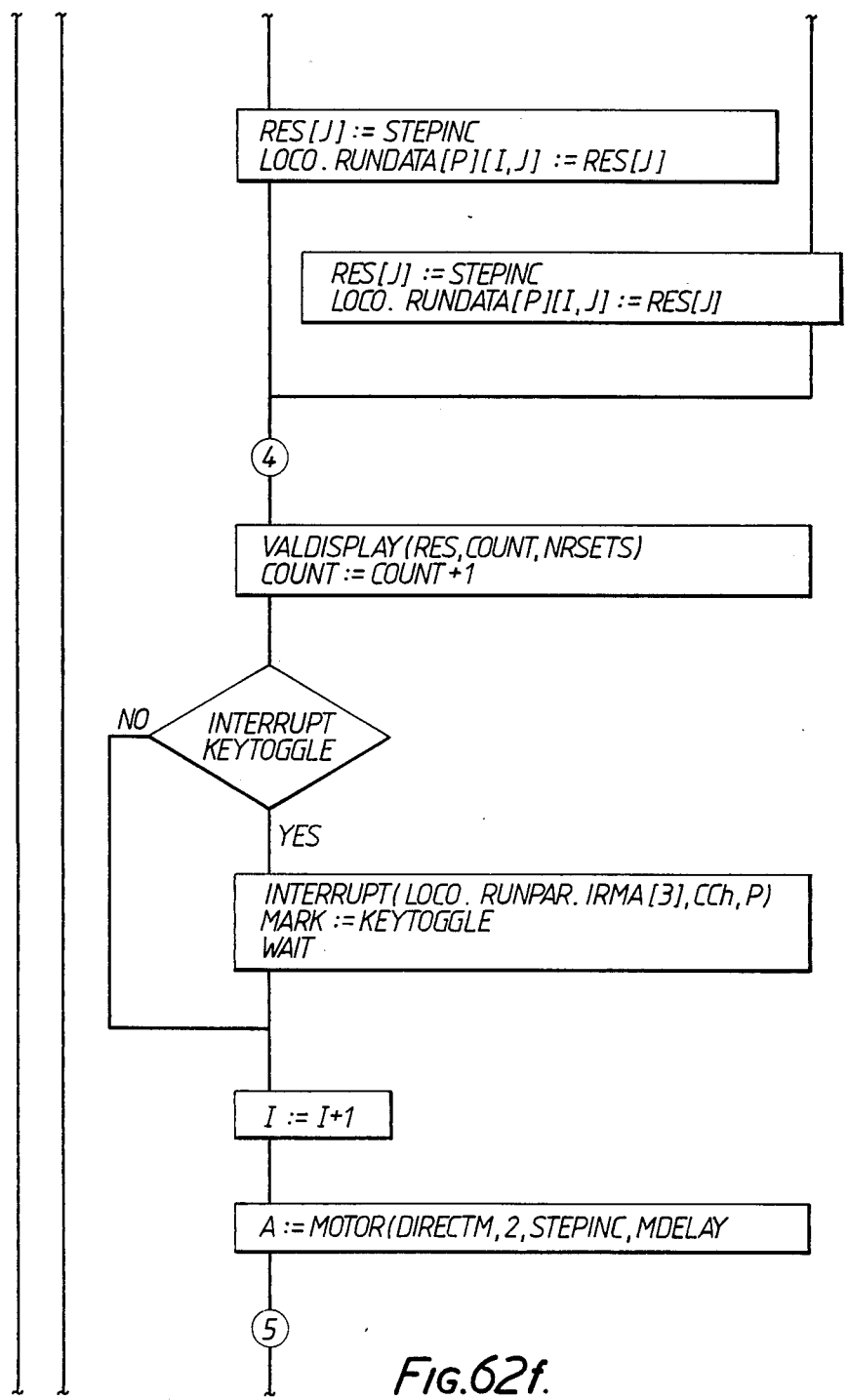
Figure 62G:
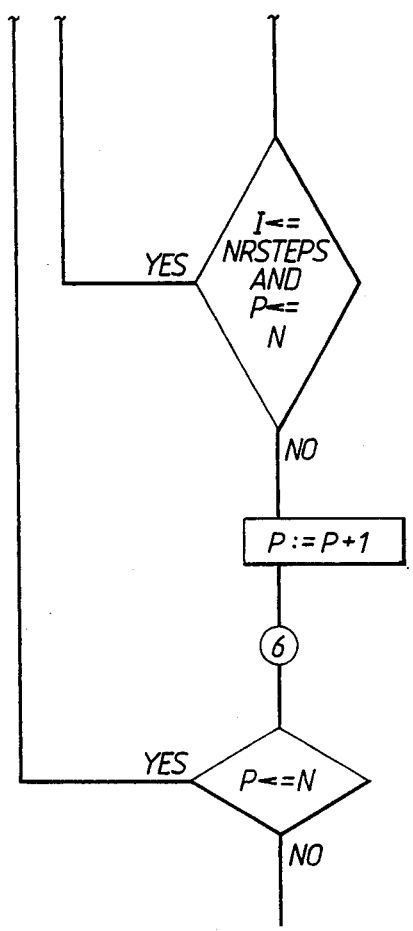

In the complete control diagram in FIG. 61 both the current estimate of the absorbance and its precision are carried forward by the filter.

The frequency estimate $\hat{X}_K(+)$ after a measurement is related, using the standard formula, to the estimate prior to the measurement by $$\hat{X}_K(+) = \hat{X}_K(-) + K[Z_K - U_K - \hat{X}_K(-)H]/H$$

where the caret denotes an estimate of the state and the (+) and (−) denote respectively the estimate before and after the control measurement action.

Figure 67:
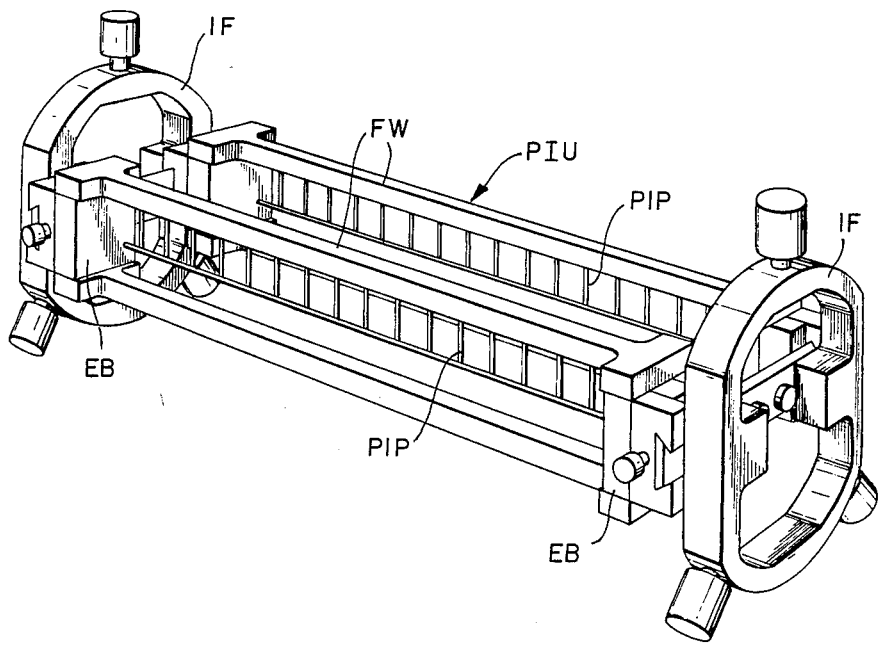
FIG. 67 is a perspective view of a pre-ionising electrode unit employed in the laser of the preferred embodiment.

The resulting difference in the frequency terms ($Z_K - V_K$)/H and $\hat{X}_K(-)$ is in the model multiplied by a fixed Kalman gain K and $\hat{X}_K(-)$ is fed back to the appropriate places in the model (see FIG. 67).

This defines a recursive filter to reduce the electronic noises which allow separation of the cavity drift and noise sources. By writing $K\alpha = 1/R$ it is indicated that averaging is effectively taking place over the previous N readings. If the Kalman gain is low then the least confience is expressed in the current measurement.

For a steady gain $$K_\infty = \sqrt{\frac{\theta}{R}}$$

where Q and R are, respectively, the variances of the system and measurement noises $W_K$ and $V_K$. In the steady state the standard deviation of the estimate is $$\Delta\sigma = \sqrt{qv} = v/n = K_\infty v$$

This deviation indicates when a correction action could be appropriate, i.e. when the difference in the best estimates $\hat{X}_K(+) - \hat{X}_K(-)$ is more than the standard deviation. One powerful feature of the Kalman filtering technique lies in the use of a recursive algorithm. Though the filter's output is based upon all data entered since initialization, the data does not have to be saved, minimizing storage requirements.

A flow diagram for the Kalman third mirror predictor-monitor software is shown in FIG. 62 consisting of FIGS. 62 a to g. The previous data shown in FIG. 58a (with no LDT activation) and FIG. 57 give the required input values for the standard deviation of a measurement $\Delta\sigma$ and the absorption change per third mirror step INCRE. also required are the target value for the absorbance locking RATIO and the number of laser shots (N above or in the software, LOCK) for the smoothing of the running measurement average. In the current implementation this selection is initially arbitrary and optimum values are found by trial and error. Clearly this process could be automated if necessary.

SHOTS is a counter for the running average. At the start of the program SHOTS is set to unity but is incremented after each shot until it reaches the values of 'LOCK'.

After each laser shot the estimate of the absorbance is updated and a check is made to find if the difference between the updated and wanted absorbance is significant, i.e., whether the test difference is greater than the standard deviation of the estimate $$\Delta\sigma/\sqrt{\text{shots}} \ .$$

Placing the MAL under the computer control exploits the flexibility arising from the software and immensely simplifies the use of the laser. For the software package the version II.1 of the UCSD P-operating system (the so called APPLE Pascal) available for the APPLE II PLUS computer was used. There is no direct addressing capability to read or rewrite a particular address (there is no equivalent of the BASIC peek and poke instructions) so procedures implementing these had to be written. The software control instructions for operating the motors, timing, detectors and VDU display are in the 6502 assembler available within the p-code system. Once these are debugged, they can be linked to form a unit, which can be incorporated into the system library and so be used without prior declaration. An exemplary program listing the procedure 'Execute' used within the locking system described above is presented hereinbelow. Most instructions are self-evident, but a few are discussed below:

"INITIM" is a library routine to initialize the timer and trigger the laser.

"DELTA" is the delay between the laser shots.

"WAIT" is a library routine to set the delay before the A/D converter is activated.

"ARCONV" is a library routine which starts the A/D conversion.

"ADELAY" is the delay between the sequential A/D conversion channels.

"LOCK" represents the weighting factor k in the Kalman gain K.

"LOCO RUNDATA [P] [I,J]" is a local variable which is used for the display and storage in RAM. P is the shot number, I is an integer for the shot series and J represents the serial data number.

"RES" [J] is the data of multiplex channel [I].

"DIRECTM" is the direction of the motor micrometer 0 to 1.

"STEPING" is the number of steps to move <1200.

"VALDISPLAY" is a routine to display the wanted integer values such as detector ratings, threshold ratio etc.

"MDELAY" is the delay between the motor micrometer steps.

"MOTOR" is a subroutine to reposition the LDT with the direction, number of steps, etc.

The codefile for the complete locking program of which "Execute" forms a part, occupies only 22 blocks and data storage requires only 17 blocks for 600 laser shots. Therefore the data from about 15 runs and can be stored on the 280 blocks available on the APPLE Pascal floppy disc.

Figure 63:
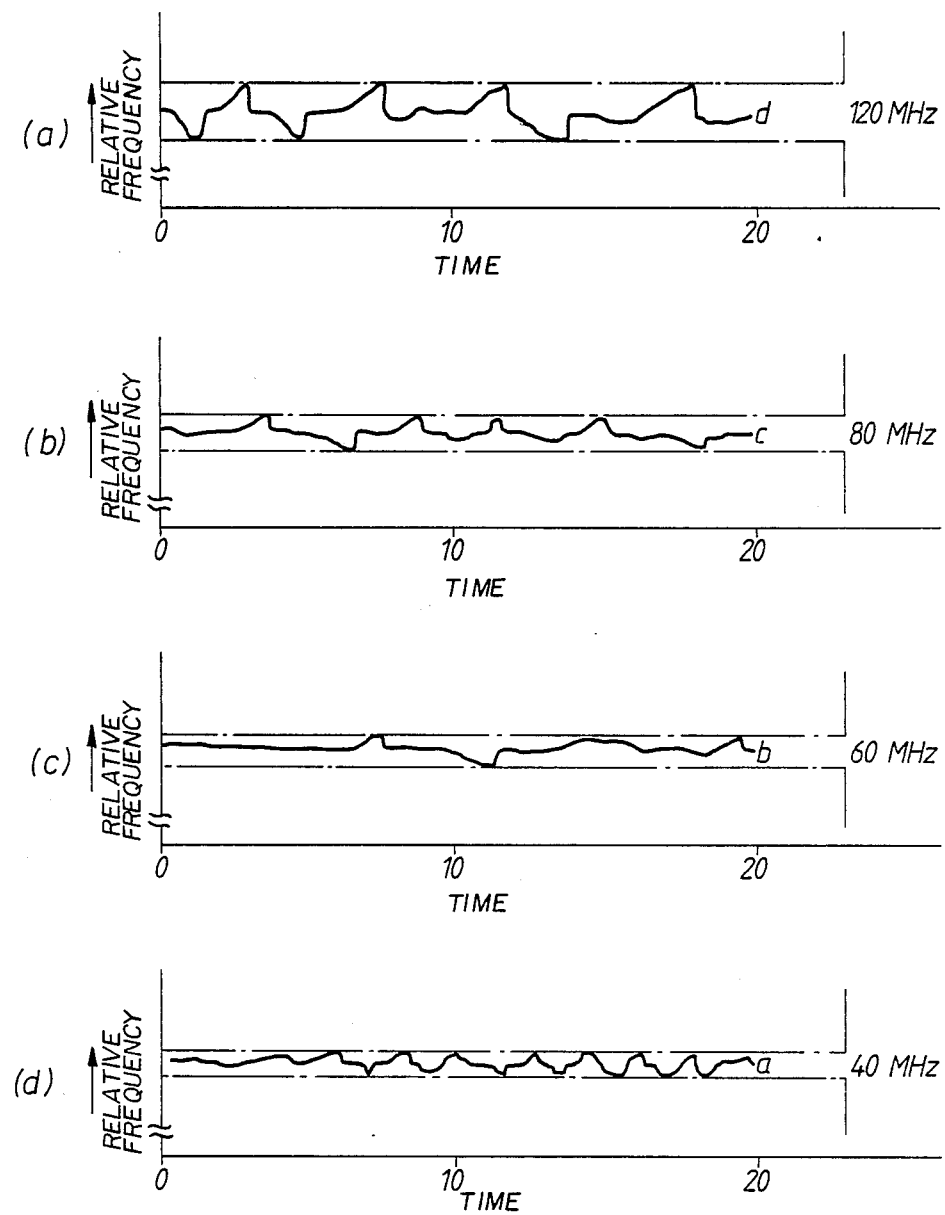
FIGS 63 (a) to (d) respectively indicate the frequency control response of the MAL of the embodiment under different conditions (relative frequency plotted vertical against time)

FIG. 63 (a to d) shows the measurement data of the absorbance values, in (E2/E1) as a function of N and corresponding with the weighing values LOCK=1, 2, 5, 25. It shows that the noise level is very low and the filter reacts more or less directly on the available data. In the experiment, the noise level was far smaller than a single LDT step. In the displayed Figures the top and bottom boundaries for the correction LDT action are indicated with dotted lines. The maximum number of correction steps needed within a run is also an indication of the frequency stability obtained. For the data of FIG. 63 (a to d) this corresponds respectively to 40 MHz, 60 MHz, 80 MHz, 120 MHz. These results indicate:

that for a high value of N=25 excessive filter smoothing takes place which corresponds with a slow response time.

an optimal locking value for N is 2 which also suggests that data is relatively noise-free.

that the obtained frequency stability of ≃20 MHz should be adequate for the initial DIAL applications.

The use of the three mirror resonator has been justified by the following advantages:

it narrows the laser linewidth ≃250 MHz;

it protects and improves the reflectivity; and it permits high resolution (third mirror) and low resolution (grating) scans.

In case a SLM mode is required, a Fox-Smith resonator may obtain better results, but a three mirror cavity provides the use of a "dual mode cluster", where the frequency separation is ∼3 GHz. Effectively, the continuously tunable mated "ON" and "OFF" frequencies are simultaneously transmitted down a super-imposed beam path by a single DIAL transmitter source with the following additional benefits with respect to a twins source TEA transmitter system:

it halves the transmitter costs;

it establishes the most compact transmitter source possible with minimum cavity dimensions and with a single optical axis (at present the overall dimensions are $1 \times 1 \times 1$ meter);

it minimizes maintenance time and costs;

it makes the frequency tracking between the two transmitter sources obsolete;

it minimizes "ON" and "OFF" wavelength separation and it ensures the alignment of transmitter and receiver channels;

it can be used to optimize the differential absorption coefficient at the two frequencies;

it can be used to avoid absorption interference and differential reflectivity in atmospheric backscatter;

it widens the scope of species to be measured.

This LTMC demonstrated an example of the computer control for the cavity arrangement described above, but other resonator configurations could be used since all mirrors are external to the pressure vessel. For a DIAL system the computer control capability is not only data storage but also monitoring and optimizing on-line operating conditions for a particular measurement. This computer controlled transmitter system avoids complex dedicated analog circuitry and implements the greater system flexibility that accompanies software control.

At present, DIAL transmitter functions such as laser optimization, wavelength and (single and dual) cluster emission frequency selection are verified under computer control.

The dynamic behaviour of the LTMC (without the common clumsy INVAR alloy structure) and the kinetics of the LDT to position the grating and third mirror have been investigated successfully, permitting cavity component scanning with (i) a measured longitudinal step increment of 44 nm (backlash 22 nm) which is more than sufficient to give the frequency control necessary for wideband lasers used in initial DIAL field trials on mobile platforms;

(ii) a rotational step increment of 40 $\mu$ rad (8 arc sec) for the grating control, which corresponds to a course frequency resolution of about 0.85 GHz;

(iii) a hands-off approach to pre-position the required reflector orientations; and (iv) a locked frequency stability of ±20 MHz.

The data presented provides evidence that this MAL DIAL transmitter system does not need any passive stabilization so that, in principle, it should be possible to use it on an autonomous platform. In principle, wavelength calibration of the laser can be easily automated by use of a low pressure absorption cell setting the initial laser bootstrap procedure, obviating the need for the optical spectral analyser in space-borne applications.

Last but not least, the similarity of the CO2, CO and excimer discharges allows the use of high pressure lasers of this type to be extended to the U.V., visible, and other I.R. spectral regions. Detailed changes in some aspects might be needed (e.g. stainless steel high voltage feedthroughs substituted for brass ones), but the modulate setup of the laser has anticipated these requirements.

Some discussion of tandem resonator and cavity reflectivity is considered now to be relevant.

Figure 43:
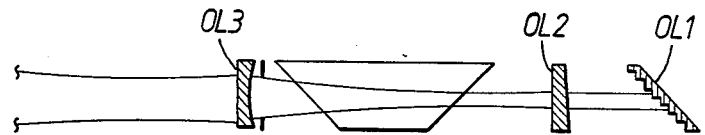
FIG. 43 is a diagram of a tandem resonator with an additional suppressor mirror.

A single sided, partially reflecting mirror is placed inside and in resonance with the laser cavity (see FIG. 43). Optimally the longitudinal modes from the two actively coupled cavities will coincide.

The mirror grating combination MGC creates a mirror reflectivity maximum that has been used for single mode generation in MAL and TEA lasers. This mirror has auxiliary advantages of being loss-free (compared with an etalon), enhancing the effective grating reflectivity, and reducing the radiant photon flux on the grating.

The effective reflectivity of the cavity should be calculated directly by considering the propagating fields within the cavity.

Apart from a small "pulling" effect, the mode frequencies are those of the long cavity, while the reflectivity is that of a two mirror cavity composed of an output coupler and composite mirror, having the (frequency dependent) reflectivity of the tandem resonator made up by the third mirror and grating.

The compound reflectivity advantages of a MGC will be formulated followed first by consideration of its mode selective effects in the TMC arrangement.

The MGC is an optical interferometer with a broadband reflector and a rotatable grating, which is mounted at the blazed angle, reflecting the 1st order of the grating parallel to the incident beam. Analysis of the composite system makes use of the description of a perfect beamsplitter which is defined by the complex reflectance $\widetilde{P}_K$ and transmittance $\widetilde{I}_K$ $$\widetilde{P}_K = P_K \exp(j\alpha k) \quad [5.6]$$

$$\widetilde{I}_K = I_K \exp(j\alpha k) \quad [5.7]$$

$$\text{where } \widetilde{P}_K\widetilde{P}_K^* + \widetilde{I}_K\widetilde{I}_K^* = R_K + T_K = 1 \quad [5.8]$$

Figure 44:
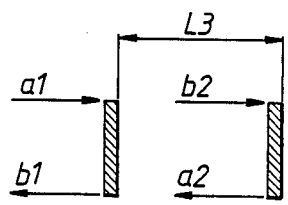
FIG. 44 is a diagram of an etalon.

The index K is used below to characterize the reflecting surface being considered (see FIG. 44). $\alpha$, $\beta$ are the phase changes on reflection and transmission, and * indicates the complex conjugate of the wave amplitude. Using the appropriate reference plane we get:

$$\widetilde{P}_K - \widetilde{I}_K = \pm 1 \quad [5.9]$$

with $\theta = \omega L_2/c$ as the single pass shift; $\omega$, $L_2$ and, C are the angular radiation frequency, optical path length and the velocity of light. The last three equations lead to the expression:

$$a_1 = \frac{1 - \widetilde{P}_2\widetilde{P}_3 \exp(j2\theta) a_2}{\widetilde{I}_2\widetilde{P}_3 \exp(j2\theta)} \quad [5.15]$$

The external complex reflection amplitude $P_{ext}$ of the incident beam on the etalon is given by:

$$\widetilde{P}_{ext} = \frac{b_1}{a_1} \frac{\exp(j\alpha_2)[P_2 - P_3 \exp\{j(2\theta + \alpha_2 + \alpha_3)\}]}{1 - P_2P_3 \exp\{j(2\theta + \alpha_2 + \alpha_3)\}} \quad [5.16]$$

Next we predict the power ratio R impinging and returning from this etalon.

$$R = \frac{P_2^2 + P_3^2 - P_2P_3 \exp[j(2\theta + \alpha_2 + \alpha_3)] - P_2P_3 \exp[-j(2\theta + \alpha_2 + \alpha_3)]}{1 + P_2^2P_3^2 - P_2 P_3 \exp[j(2\theta + \alpha_2 + \alpha_3)] - P_2P_3 \exp[-j(2\theta + \alpha_2\alpha_3)]} \quad [5.17]$$

with maximum etalon reflectivity of $$R_{max} = \frac{(\sqrt{R_2} + \sqrt{R_3})^2}{(1 + \sqrt{R_2R_3})^2} \quad [5.18]$$

We define $P_{com}$ as the complex wave ratio of the radiation impinging on the grating $b_2$ to that on the etalon $a_1$. In other words:

$$\widetilde{P}_{com} = b_2/a_1 \quad [5.19]$$

From eqn [5.12] and [5.13] we obtain:

$$\widetilde{P}_{com} = \widetilde{I}_2/(I - P_2 P_3 \exp(j2\theta))$$

Taking the square modules to obtain the compound reflectivity $R_{com}$, we get:

$$R_{com} = \frac{I_2}{1 + P_2P_3 - 2\ P_2P_3 \cos(2\theta + \alpha_2 + \alpha_3)} \quad [5.21]$$

with as optimum R cmax:

$$R_{cmax} = \frac{1 - R_2}{(1 + \sqrt{R_2R_3})^2} \quad [5.22]$$

Figure 45:
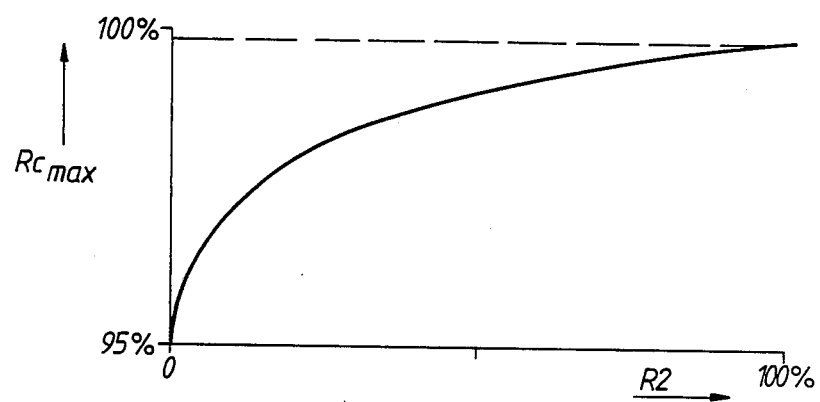
FIG. 45 is a graph of the compound reflectivity of an etalon combination including a grating as a function of the grating reflectivity.
Figure 46:
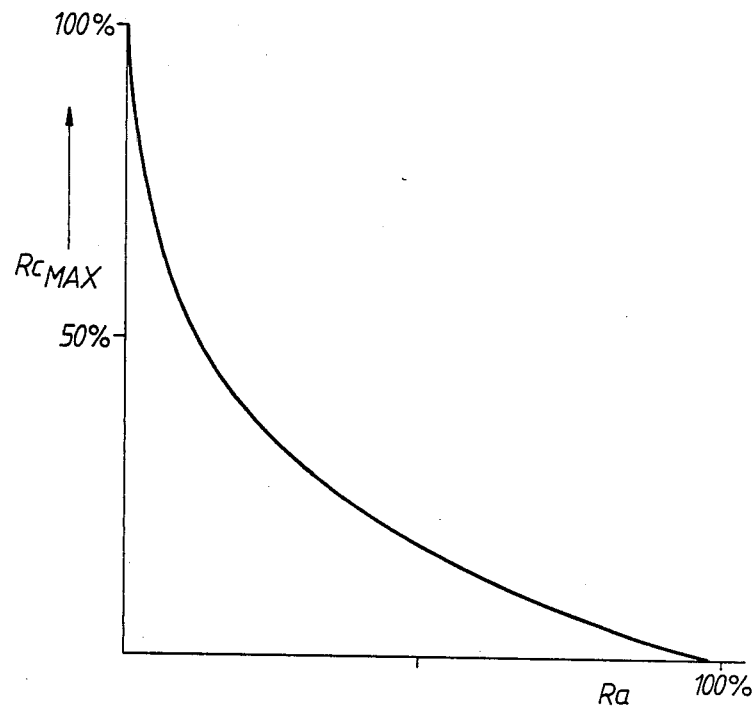
FIG. 46 is a graph of a parameter of the grating to which FIG. 45 relates as a function of a suppressor mirror reflectivity.

With the assumption that there is no transmission loss between the reflection side of the third mirror and the grating, the effect on the total reflectivity using the additional mirror is shown in FIG. 45. Even a low single-sided reflective "suppressor" with a modest value of 17% will raise the compound reflectivity to 98% with an assumed grating reflection of 95%. The optical power impinging on the grating is reduced to 145% of that on the composite mirror (see FIG. 46).

Figure 47:
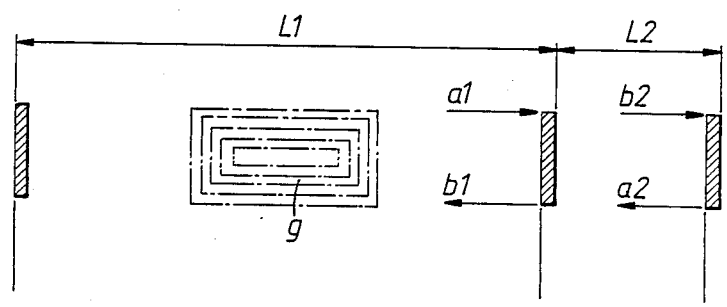
FIG. 47 is a diagram of a three mirror combination.

The use of tandem interferometric resonators for internal mode selection in laser cavities has the advantages of improved frequency selectivity in comparison with a grating, as well as an absence of walk-off effects and insertion loss in comparison with an internal etalon. Hence the basic cavity properties like longitudinal mode selectivity and their related resonator lengths are reviewed. A laser medium and output coupler together with the MGC is illustrated in FIG. 47.

We neglect the refractive index changes which occur within the discharge volume, and restrict our considerations to the passive or so called "cold" cavity modes to obtain an expression for wavelength selection.

Calculation of the composite mirror reflectivity uses the relations eqn [5.6]–[5.11]. A gain medium (see FIG. 47) introduces a round trip gain g so that:

$$a_1 = P_1^\circ g b_1 \quad [5.23], \text{ and}$$

$$a_2 = P_3^\circ b_2 \quad [5.24]$$

For convenience we combine the earlier specified reflectivity $\widetilde{P}_K$, k=1,3, with the phase change over the path length of, respectively, L1 and L3, so that:

$$P^0_1 = \widetilde{P}_1 \exp(j2\theta_1) \quad [5.25]$$

or $$P^0{}_1 = P_1 \exp(j[2\theta + \alpha_1]) \quad [5.26]$$

where l is the phase change in the resonator arm. With some basic manipulations of eqns [5.2–5.26] this leads to:

$$g = \frac{1 - \tilde{P}_2 P_3{}^0}{P_1{}^0[\tilde{P}_2 - P_3{}^0 \tilde{P}_2{}^2 + \tilde{T}_2{}^2 P_3{}^0]} \quad [5.27]$$

The following threshold relation holds:

$$1 = R_{EFF} g g^* \quad [5.28]$$

resulting in the following expression for the effective cavity reflectivity $R_{EFF}$:

$$R_{EFF} = \frac{P_1{}^2[P_2{}^2 + P_3{}^2 - P_2 P_3 \exp\{j(2\theta + \alpha_2 \alpha_2)\}] - P_2 P_3 \exp[-j(2\theta + \alpha_2 + \alpha_3)]}{1 + P_3{}^2 P_2{}^2 - P_2 P_3 \exp[j(2\theta_3 + \alpha_2 + \alpha_3)] - P_2 P_3 \exp[-j(2\theta_3 + \alpha_2 + \alpha_3)]} \quad [5.29]$$

In eqn [5.29] it can also be noticed that the combination produces the classical result:

$$R_{EFF} = P_1{}^2 P_3{}^2$$

on a Fabry-Perot etalon laser system. The LTMC relation eqn [5.29] can be obtained by replacing $P_3$ in equation [5.30] for the F.P. etalon laser with the MGC reflectivity R in equation [5.17].

The MGC therefore adjusts as a reflection etalon in a conventional cavity. A LTMC could be designed to optimize the "system resonance" of the MGC in order to discriminate and reduce the modes inside the long resonator.

However, in a homogeneously broadened laser line it might be anticipated that the gain induced mode competition will improve the active discrimination. For example, for a multi-atmospheric CO2 discharge laser with a simple output coupler grating cavity, the grating reflection bandwidth is ≈3 GHz in an active environment although, according to eqn. [5.4], it would be expected to be ≈21 GHz. If we allow for this by simply assuming that the grating has a bandwidth of ≈3 GHz, the reflectivity of the three-way cavity as a whole can be calculated from eqn [5.29]. The reflectivity Reff is plotted in FIGS. 48 a, b, and c with the reflectivites and resonator length which are specified in Table 5.1.

TABLE 5.1

RESONATOR COMBINATIONS FOR THE LTMC

| FIG. | Long cavity length | Short cavity length | Output coupler reflect | Grating* reflect. | Suppressor reflect. |
|------|-----|-----|-----|-----|-----|
| 5.9a | 110 cm | 3.8 cm | 67% | 95% | 36% |
| 5.9b | 110 cm | 3.8 cm | 67% | 95% | 17% |
| 5.9c | 110 cm | 6.1 cm | 67% | 95% | 17% |
| 5.9d | 110 cm | N/A | 67% | constant | N/A |

*over the illustrated wavelength range we assume a Gaussian reflectivity with a FWHM 3 GHz at the selected 10P20 line.

FIG. 45 demonstrates relative positions of the long cavity modes, which approximate the modes of the complete three-mirror cavity. From the other three Reff plots 45 a, b, c, we discover that L3 has to be sufficiently small to adequately separate the low-loss modes. The minimum length L1 which we can accommodate is limited to the distance between the two Brewster windows, so there is a large number $(L_1+L_3)/(L_3)$ of the long cavity modes within the free spectral range of the short cavity. The long resonator supports too many modes for them all to be adequately suppressed by the losses of the short resonator. However, the MGC modulates the frequency output which depends on the reflectivity of the rsonator, as illustrated in FIGS. 45, a, b, c.

(a) shows that the reflectivity of the third mirror is too high, so that the secondary resonance peak is almost not reduced.

(b) shows that if the reflectivity is reduced to 17% then there is no second peak in the MGC code spectrum. This graph indicates that about 18 resonator modes take part in the mode competition spectrum.

Figure 48:
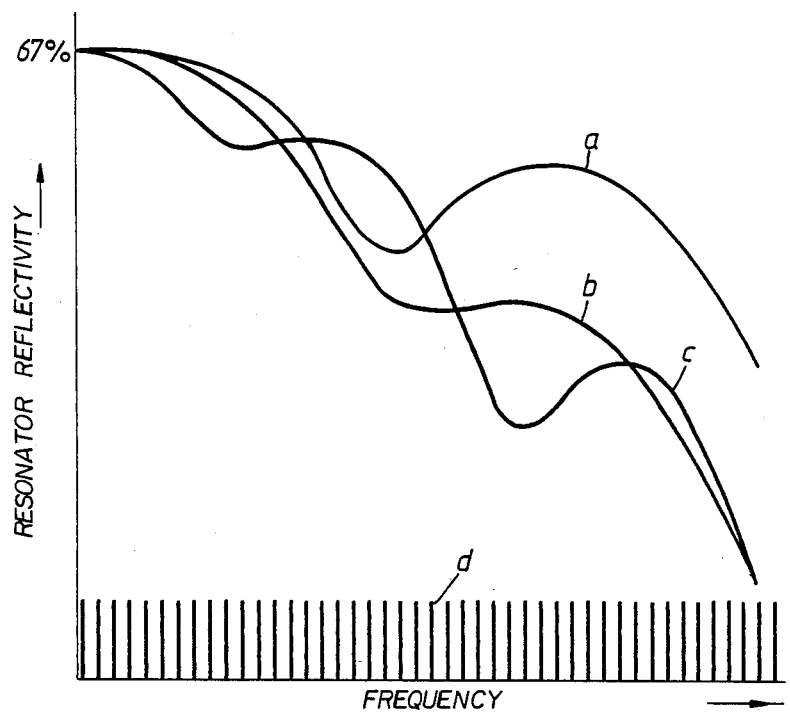
FIG. 48 is a graph of the frequency selectivity of a LTMC, with resonator reflectivity plotted vertically and frequency plotted horizontally, and also of the mode spacing of a LTMC.

(c) shows that making the MGC too long has the same consequence as in FIG. 48.

Observations have been made both of lasing with a single MGC resonance and within two MGC modes.

SLM operation has been observed at 30 mJ with an eight atmosphere laser having an FSR of 1.2 GHz when SLM operation was attributed to mode competition affected by the number of cavity roundtrips close to threshold. In our experiments well above threshold, mode selection at 136 MHz was observed, single (long cavity) mode operation was not feasible even when using our short MGC cavity. In DIAL systems such as the above described systems, lasers have many direct applications. Their use as pumps in tunable Raman lasers is recommended, and dye lasers are also currently favored.

Figure 64:
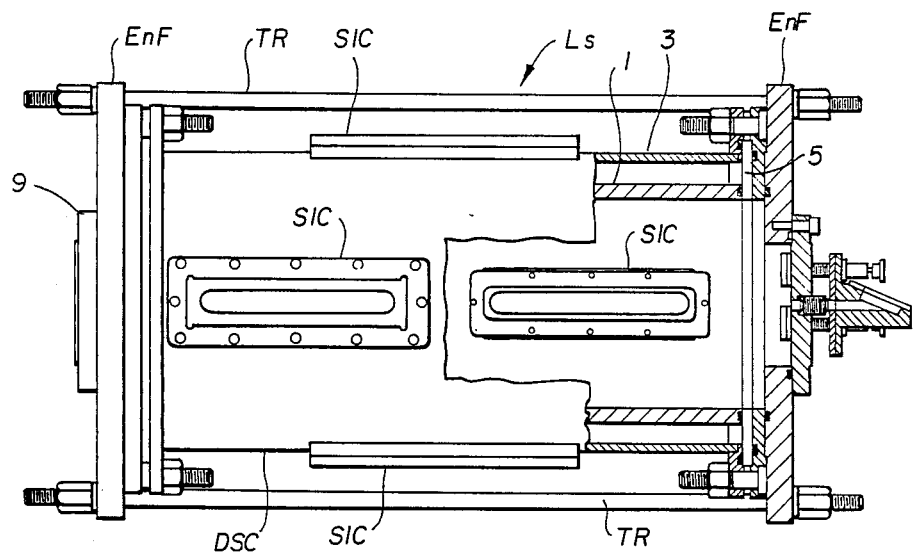
FIG. 64 is a side elevation of a high pressure, pulsed laser in accordance with the invention, with parts broken away or sectioned to reveal otherwise hidden detail.
Figure 68:
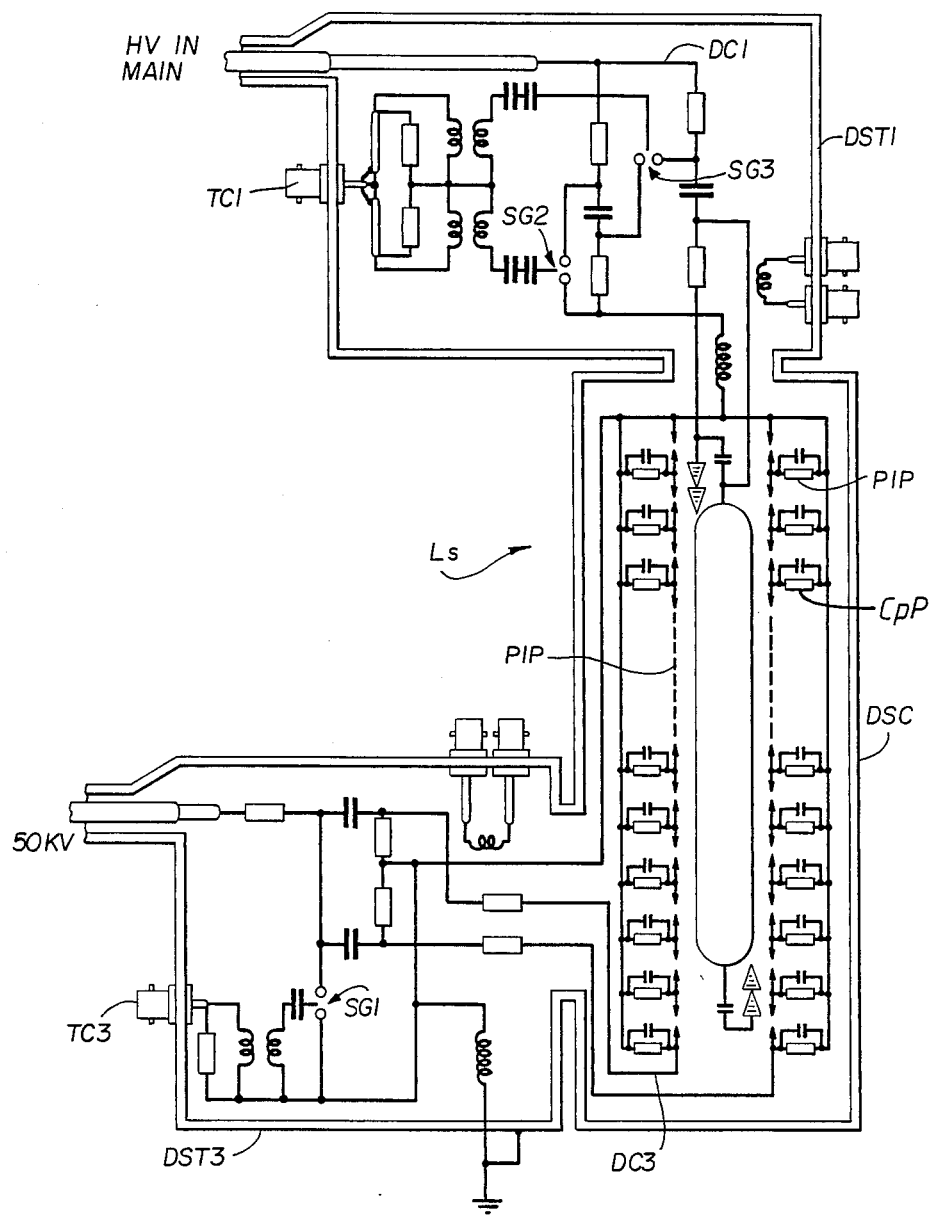
FIG. 68 is a diagram showing the essential circuit of the pre-ionising electrode unit.

The laser presently employed, generally indicated as LS (FIGS. 1 and 64), comprises a discharge chamber, generally indicated at DSC (FIG. 64). The discharge chamber comprises two vessels in the form of stainless steel tubes 1, 3 (as shown in FIG. 64) located co-axially one within the other with the outer one being directly grounded (see FIG. 68). Each of the two tubes is provided with three pairs of diametrically opposed axially directed access slots for high-voltage leads and, e.g., to admit cooled gas if cooling is used, and also to act as inspection or diagnostic ports; the slots being closable by bolted-on covers such as covers SIC with the slots of the inner tube 1 being aligned with those of the outer-tube 3.

The inner and outer stainless steel tubes form a first and second electro-magnetic screen for the discharges; the inner tube only takes the gas pressure. Short circuiting the two coaxial vessels did not meet the requirement of providing adequate screening.

Figure 69:
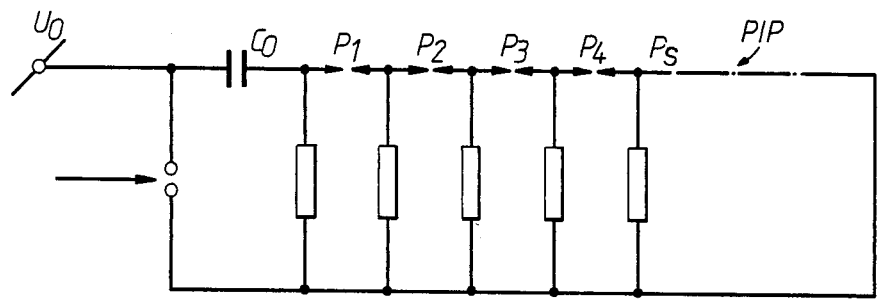
FIG. 69 is a diagrammatic representation of the main and pre-ionising discharge circuits and associated trigger circuits respectively and their housings.

FIG. 69 shows a pin array PIP, the gap (P1 to Ps respectively) between opposed pins being 0.8 mm. Initially the storage capacitor Co is charged to a potential of 65 KV. After the spark-gap is triggered, the voltage rises on the first pin of gap P1. The second pin of gap P1 is at a low potential and the gap breaks down. All pins are loaded with a resistor in this instance of 50KΩ to form a high impedance for the incremental surge current. The potential across gap P2 rises until the second gap breaks down and this continues for all the remaining gaps until all gas between the pins is ionized. After this sliding spark, the discharge path avoids the 50KΩ resistors resulting in a low impedance and high current characteristic.

The simple configuration is an improvement over previously reported sliding spark TEA and MAL lasers. The main departure is use of a four sliding spark array of pre-ionised pins PIP in a double sided geometry next to the top and bottom electrodes. The tungsten pins are symmetrically displaced with respect to the optical axis. Homogeneity of the ionization photons for the preconditioning of the main lasing gap and the lack of obstruction to transverse gas flow are particular improvements in this set-up. The arc arrays on each side of the electrode are fed by different capacitors which makes it easier to match the circuit parameters, producing more uniform and critically damped breakdown, which boosts U.V. production and avoids erosion of the P.I. pins. As indicated above, the pre-ioniser is isolated from the main discharge so the delay between these two discharges can be tuned. Delay times are between 200 nsec to 1.5 $\mu$ sec to provide satisfactory plasma conditions.

The time interval between the surge currents at successive spark gap breakdowns is less than 1 nsec. For the 33 gaps this results in an overall delay of less than 33 nsec. It has been found that a delay of 75 nsec between the triggers of the P.I. and main bank is satisfactory. The optimal delay between P.I. and main discharge recommended is about 200 nsec., and is in close approximation to what was found.

After the initial runs with the laser, the P.I.-unit was improved by introducing capacitors $C_pP$ in parallel with the resistors (see FIG. 69) with a value of 180 $pF$ each. Effectively the surge current is forced to charge and discharge these spark peaking capacitors, which extend the photon production.

Operation of the P.I. unit suggests the following:

(a) a double row of sparks with a 50% offset to one another gives improved uniformity compared with a single sided illumination.

(b) In order to achieve a reasonably homogeneous photon distribution to precondition the main electrode gap, a spark is required every 2 cm.

(c) To avoid tail-off end-effects on the photon ionization caused by the limited pre-ioniser length, the latter must exceed the electrode length; with the 250 mm long electrodes, a 300 mm P.I. is used.

(d) the most critical parameter is the distance of the spark array from the electrode centre-line and this should be minimized. The P.I. offset employed was between 2 and 5 cm.

Uniformity of pre-ionisation in the direction transverse to the main discharge current flow is more essential than uniformity in the parallel direction. Space charge effects distort the local electric field and the ionization rate, but smooth the plasma non-uniformities that develop during discharge initiation and create a uniform discharge.

Figure 65:
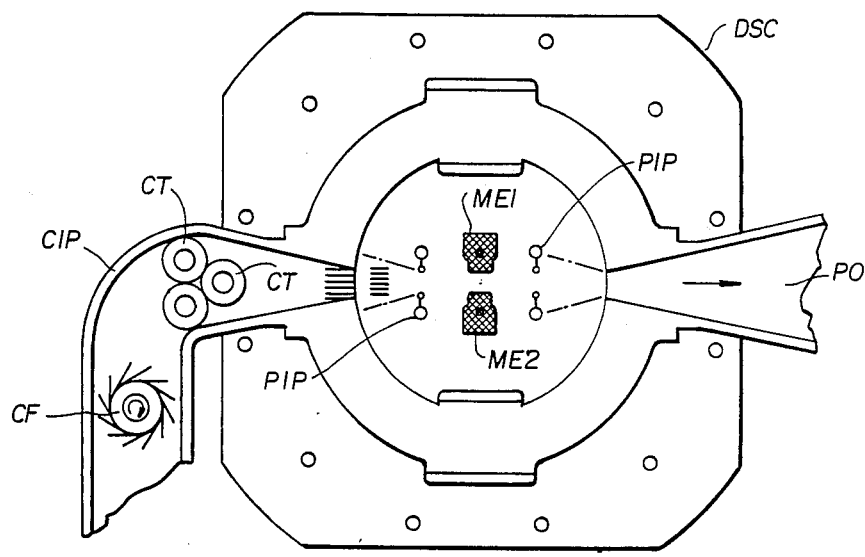
FIG. 65 is a schematic cross-section of the laser of discharge chamber showing a gas flow system for cooling the laser gas.

Two ring sets one of which is seen in FIG. 64 and is generally indicated at 5, seal the space between the stainless tubes. This space can accommodate cooling liquid to remove excess heat from the gas reservoir, and the ring sets hold the inner vessel in position. The discharge chamber is faced at either axial end with end flanges EnF held together by tensile rods TR, to withstand the axial pressure, and in the center the end flanges carry circular ports which are used to mount Brewster windows or resonator mirrors such as indicated at 9. The complete discharge section is seen in FIG. 65 in front elevation. The main lasing volume between the mail electrodes ME1, ME2 is preconditioned by 4 arrays of pre-ionising, sliding spark gaps assembled as a unit, PIU (see especially FIG. 67), to create a weak conducting medium for the main discharge; there being a pair of arrays flanking each of the top and bottom main electrodes. The bottom and top main electrodes which are obscured in FIG. 66 by the P.I.-unit, are placed in their appropriate slot sections and have the facility to be positioned in XYZ directions and to be rotated about an axis parallel to the optical axis. It is possible to adjust the inter-electrodes gap (in practise between 4 and 11 mm) with the electrodes in position, by using the reference faces on the electrodes and custom jig without altering in any way the support structure.

The P.I.-unit is shown in FIG. 67. For simplicity the unit seen in FIG. 64 shows two of the arrays of pairs of pre-ionised pins PIP mounted on supporting frameworks FW dovetailed into end blocks EB carried by insulating end frames IF mounted, in use, in the inner tube of the discharge chamber. The assembly, for convenience could be mounted directly on the main electrodes in a self-synchronizing mode. A design feature here was the ability to alter the P.I.-electrode distance and optimize the preconditioning of the main electrodes with U.V. photons and to avoid flashover (arcing) between the P.I. unit and main electrodes.

FIG. 65 is a schematic cross-section of the laser chamber showing a possible gas flow system, in which the gas input port GIP, comprising a cooling fan CF, ducts gas into the laser chamber LC over proprietary cooling tubes CT, the flow being laminar and not obstructed by P.I. pins PIP, to flow between the electrodes MEL 1 and 3 and then to exit, via the outlet port $P_o$ from where it is recirculated back to the input port GIP. Additional or alternative cooling means may be provided by circulating coolant through ducts formed in the electrodes themselves.

The pressure vessel was first tested for pressure and vacuum requirements. Each particular slot section was adapted, to cope with the individual requirements such as a high voltage feed-through (see FIG. 66), after which pressure and vacuum tests were repeated. In the light of the experience gained with this development device, a smaller laser could be constructed for push-button use on a mobile operational I.R. RADAR platform.

Figure 66:
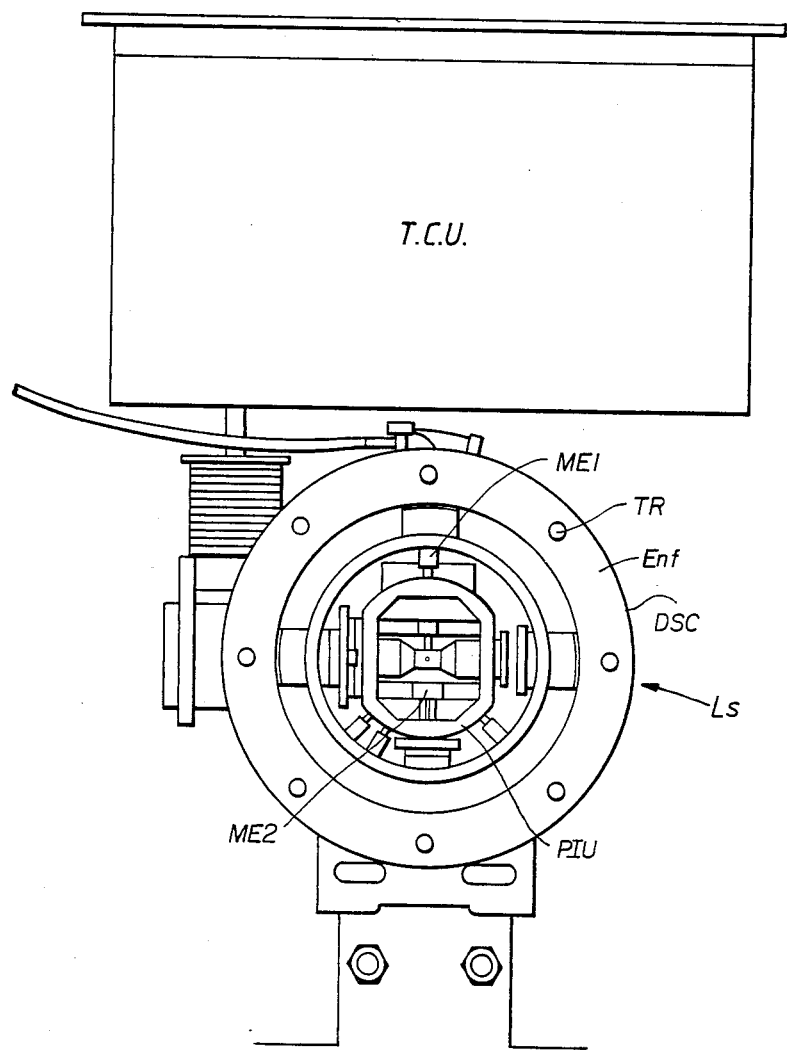
FIG. 66 is a sectional front elevation of the discharge chamber of the laser showing the high voltage feeds thereto with parts omitted for clarity.

At the bottom of FIG. 66, the top of the support structure for the high pressure laser is also shown. This support structure allows a tubular rail carrying optical elements to be decoupled mechanically and electrically from the main discharge section. Top and side dovetails of the rail offer convenient mounting conditions for the optical components such as the external linear three mirror cavity.

Characterisation at the laser cavity is done by use of a CW-$CO_2$ discharge section. All optical components and computer cavity control systems used were tested before being implanted in the laser. The double screen constituted by the tubes 1, 3 is extended as indicated at DST1 and DST3 respectively in FIG. 69 to house the main discharge circuit DC1 and its trigger TC1, and the pre-ionising discharge circuit DC3 and its trigger TC3, so that these circuits are housed within a double electromagnetic screen. The positions DST1 and DST3 may be separately formed and then made integral with the discharge chamber.

Operation of the P.I. unit suggests the following:

(a) a double row of sparks with a 50% offset to one another gives improved uniformity compared with a single sided illumination.

(b) In order to achieve a reasonably homogeneous photon distribution to precondition the main electrode gap, a spark is required every 2 cm.

(c) To avoice tail-off end-effects on the photon ionization caused by the limited pre-ioniser length, the latter must exceed the electrode length; with the 250 mm long electrodes, a 300 mm P.I. is used.

(d) The most critical parameter is the distance of the spark array from the electrode center line and this should be minimized. The P.I. offset employed was between 2 and 5 cm.

Uniformity in pre-ionisation in the direction transverse to the main discharge current flow is more essential than uniformity in the parallel direction. Space charge effects distort the local electric field and the ionizaiton rate, but smooth the plasma non-uniformities that develop during discharge initiation and create a uniform discharge.

The Marx bank (main discharge) and P.I. circuits had approximately a pulse power of 10W at a voltage of 50 KV and currents of 2KA. This is in contrast with the low power networks of current electronic control and diagnostic equipment. Both must share the same wall plug facilities, which leads to grounding problems. Sensitive optical detectors with a $10^{-14}$W diagnostic signal ($1\mu$V into $100\Omega$) make an isolation factor of $10^{22}$ necessary between power source and real time optical diagnostics. It is also essential to be able to operate computers and real time diagnostics in a nearby vicinity and for the remote sensing equipment to be able to operate the computer controlled optical resonator for automated frequency selection and locking. The associated problems of electromagnetic interference in the communication field are similar, but in the present laser system they are distinguished as follows:

the circuitry used a single pulse low repetition rate technology and no CW or quasi CW waveforms are used.

the pulse networks have higher peaks currents.

Even if circuits are highly conducting, large e.m.f.'s will develop when surge currents with rise times of 50 nsec flow through them owing to the inductance of the current loop. This can be minimized by use of large flat conductor geometry. The problem areas are multiple earth loops in the main discharge and pre-ioniser leads, trigger and diagnostics cables. Apart from the physcial wiring there are the effects of stray capacity at high frequencies and the released electromagnetic radiation during the discharge, both of which add noise sources. The radiated energy will inductively couple with water and gas supplies or concrete reinforcement, which involve the surrounding building structure and influence the whole main wiring. Total control of these circuit problems and interference factors is necessary to minimize pick-up. The approach adopted was to reduce these interference levels at the source rather than to rely on isolating everything else. That is, a complete double shielding enclosure was used to accommodate the high voltage and discharge circuitry which is effectively disconnected from the other electronics during the discharge pulse.

The main problem regarding external circuitry arises from the trigger units which obviously have to remain physically connected to the supply to initiate the laser pulse.

Figure 70:
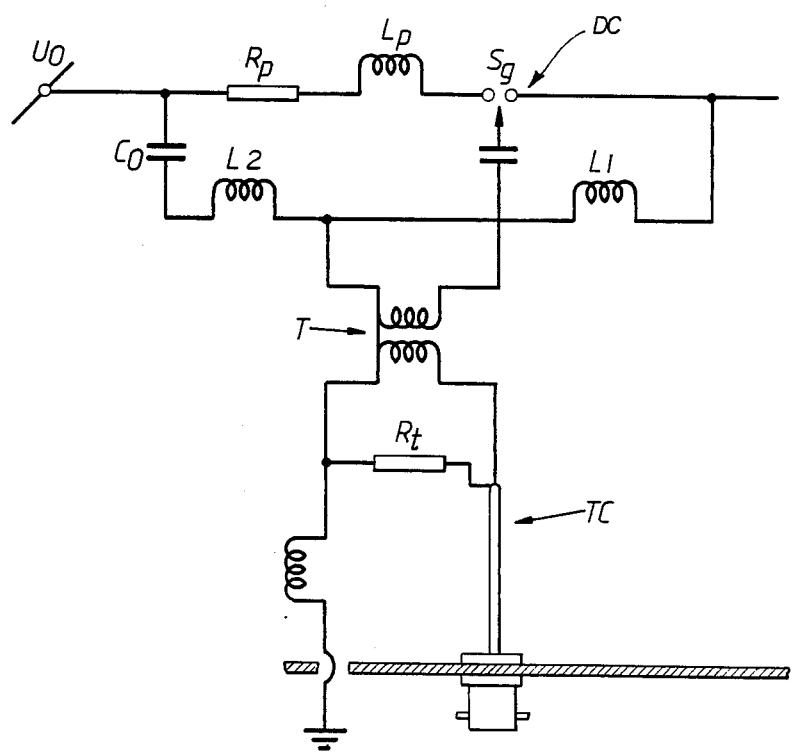
FIG. 70 is a circuit diagram of a discharge circuit in simplified form with an associated trigger circuit.

To indicate that effect, a simple representation is used of the Marx bank circuit with a condenser value $C_o$ 5 nF and a charging voltage of 50 KV (see FIG. 70 which illustrates a simplified discharge network DC with trigger circuit TC). The trigger circuit comprising a transformer T through which a spark gap SC of the discharge circuit is activated by a pulse from the trigger circuit, the trigger circuit providing the ground return for the discharge circuit. The plasma load is $L_p$ and $R_p$ representing the inductance and resistance respectively. The ground return side is divided in two parts with an inductance L1 and L2, with L2 assumed to be 1/10 of the total inductance L found previously to be about 0.4 H.

Although the circuit inductance is very low, the generated e.m.f. injects a voltage pulse on the ground lead which is unavoidable.

Rt is a trimming resistor (see FIG. 70) which is initially assumed to be 01. In practise a 10 meter cable with an inductance of (10 $\mu$ H) is used as trigger cable. This inductance acts in parallel with the circuit inductance of 50 nH, so that a main current of 1.9 KA will induce currents in the order of 10 A in the braid of the coax cable. For the latter with a braid resistance of $10^{-2}\Omega m^{-1}$, the imposed current transient will result in a voltage spike of 1.0 V on the general earth system. This voltage spike is minimized by maximizing the value of the trimming resistor Rt. The circuit is then virtually floating during the discharge with the current only affecting the appropriate conductors, completing a round trip berween the capacitor places. In practise, a value Rt of 100 permitted reliable triggering with a jitter of 30 nsec., together with adequate isolation. For shielding purposes all leads are grouped on small interconnection panels on the screening and the high voltage cable feedthroughs were accommodated within tubes having a length of five times the diameter to avoid E.M. radiation leaks. Likewise, the braid of the coaxial cables was securely bound to the wall of the screening enclosure. The enclosure itself (see FIG. 69) was an extension of the high pressure vessel. All circuit and discharge devices were therefore within a continuous metal envelope, resulting in isolation over 60 dB better than was obtained with a mesh enclosure. In the double wall screening used here, the outer screen was connected to earth and the inner was left floating. This is shown in FIG. 69 which diagrammatically illustrates a Marx bank and P.I. discharge circuits with current diagnostic ports. The single ground return lead for the entire circuitry was connected in series with a coil to avoid transient pulses on the ground lead from the P.I. and main discharge current.

The P.I. pins were grouped in two sections around the main electrode. Each P.I. section was separately connected with a 5 nF capacitor and fired with a common spark gap (SG1). The main electrode Marx bank had two spark gaps (SG2 and SG3) to switch the main discharge current. These were both triggered simultaneously. It was found that the simpler mechanism of triggering SG2 by over-volting caused too much jitter.

I claim:

1. A laser comprising:
   (a) an optical resonator, said resonator comprising an optical element;
   (b) means for mounting said optical element for rotation about a vertical axis and a transverse horizontal axis of the optical element, said mounting means itself being mounted to be displaceable in the direction of an optical axis of the laser;
   (c) motive power means for effecting displacement of said mounting means and for effecting rotation of said optical element about its vertical axes and its transverse horizontal axis respectfully; and (d) means for effecting control of said motive power means by a computer including means under the control of the computer for automatically adjusting the orientation of the optical element in respect to the two axes of rotation.

2. A laser according to claim 1, wherein said mounting means mount said optical element to permit said element to be further rotatable about a longitudinal axis of said element.

3. A laser according to claim 1, wherein said optical element is a reflector element and said optical resonator further comprises an output coupler and a mirror forming, along with said reflector element, a third mirror cavity; and means for mounting said mirror between said reflector element and said output coupler.

4. A laser according to claim 1, wherein the resonator is oriented to provide maximum feedback to the computer from the output of the laser to extract the energy from the laser along a single optical axis thereof, the feedback signal from the laser having spatially distributed energy in a single gaussian form.

5. A laser according to claim 1, wherein said optical element of the optical resonator is mounted independently of a discharge chamber of the laser.

6. A laser according to claim 1, wherein a discharge chamber of the laser comprises a multiple electromagnetic screen in the form of a plurality of vessels located one within the other.

7. A laser according to claim 6, wherein the outermost vessel is grounded.

8. A laser according to claim 1, further comprising an array of pre-ionizing electrodes and a discharge circuit with a trigger circuit therefor, for initiating a discharge between the discharge electrodes of the laser upon operation of the discharge circuit for the discharge electrodes, wherein the two circuits are housed within a multiple electrode screen.

9. A laser according to claim 8, wherein the discharge circuit for the discharge electrodes effects a discharge by release of stored electrical energy on closure of a circuit make/break device, and a trigger circuit for that discharge circuit is inductively coupled to the discharge circuit to effect closure of the circuit make/break device, the trigger circuit constituting the ground return of the discharge circuit and one of the trigger and discharge circuits comprising a current limiting device selected from a trimming resistor and a switch arranged to isolate the trigger circuit from supply upon pulsing of the laser, in order to prevent the imposition of a voltage pulse on the ground return of the trigger circuit when the discharge circuit is operated.

* * * * *